United States Patent
Sano et al.

(10) Patent No.: US 8,235,181 B2
(45) Date of Patent: Aug. 7, 2012

(54) ELECTRIC CABLE DRIVE DEVICE AND ELECTRIC BRAKE DEVICE

(75) Inventors: Ritsu Sano, Hyogo (JP); Tatsuya Imakura, Hyogo (JP); Chikashi Okamoto, Hyogo (JP)

(73) Assignee: Hi-Lex Corporation, Hyogo (JP)

( * ) Notice: Subject to any disclaimer, the term of this patent is extended or adjusted under 35 U.S.C. 154(b) by 946 days.

(21) Appl. No.: 11/631,317

(22) PCT Filed: Jun. 30, 2005

(86) PCT No.: PCT/JP2005/012061
§ 371 (c)(1),
(2), (4) Date: Dec. 1, 2008

(87) PCT Pub. No.: WO2006/003983
PCT Pub. Date: Jan. 12, 2006

(65) Prior Publication Data
US 2009/0247364 A1    Oct. 1, 2009

(30) Foreign Application Priority Data

| Jun. 30, 2004 | (JP) | 2004-194173 |
| Jan. 17, 2005 | (JP) | 2005-008653 |
| Jan. 17, 2005 | (JP) | 2005-009288 |
| Feb. 25, 2005 | (JP) | 2005-051580 |
| Feb. 25, 2005 | (JP) | 2005-051834 |
| Apr. 13, 2005 | (JP) | 2005-116212 |

(51) Int. Cl.
*F16D 65/36* (2006.01)
(52) U.S. Cl. .................. 188/2 D; 188/156

(58) Field of Classification Search ............ 188/2 D, 188/156–164
See application file for complete search history.

(56) References Cited

U.S. PATENT DOCUMENTS

| 5,180,038 | A * | 1/1993 | Arnold et al. ............ 188/171 |
| 5,408,153 | A | 4/1995 | Imai et al. |
| 5,590,744 | A * | 1/1997 | Belmond ................. 188/265 |
| 6,213,259 | B1 * | 4/2001 | Hanson et al. ........... 188/156 |
| 6,244,394 | B1 * | 6/2001 | Gutierrez et al. ......... 188/72.8 |
| 6,446,768 | B2 * | 9/2002 | Kikuta et al. ............. 188/162 |
| 6,533,082 | B2 * | 3/2003 | Gill et al. ................. 188/156 |

(Continued)

FOREIGN PATENT DOCUMENTS
EP    0 710 595 A1    5/1996
(Continued)

OTHER PUBLICATIONS
International Search Report issued in PCT/JP2005/012061.

*Primary Examiner* — Christopher Schwartz
(74) *Attorney, Agent, or Firm* — Browdy and Neimark, PLLC

(57) ABSTRACT

An cable drive device (10) having a motor (M), a speed reducer (G), a nut member (26) connected to the speed reducer, a rod (32) screwed to the nut member (26) and guided by a guide member (34) so as not to rotate, a control cable (15) composed of an inner cable (45) connected to the rod and a guide tube (49) for guiding the inner cable, a sensor for detecting the amount of operation of the cable based on the amount of rotation of the speed reducer (G), and a load sensor (17) for detecting a load applied to the cable. An electric brake device can be obtained by connecting the control cable and a brake mechanism of the cable drive device (10).

15 Claims, 19 Drawing Sheets

U.S. PATENT DOCUMENTS

| | | |
|---|---|---|
| 6,848,545 B2 | 2/2005 | Scheuring, III et al. |
| 6,938,736 B2 * | 9/2005 | Takahashi .................... 188/72.1 |
| 7,490,699 B2 * | 2/2009 | Gil et al. ........................ 188/2 D |
| 2002/0108816 A1 * | 8/2002 | Taniguchi .................... 188/2 R |
| 2005/0225166 A1 * | 10/2005 | Greenberg et al. ............. 303/89 |

FOREIGN PATENT DOCUMENTS

| | | |
|---|---|---|
| EP | 975497 A1 | 2/2000 |
| EP | 975498 A2 | 2/2000 |
| EP | 1211149 A2 | 6/2002 |
| JP | 63-253892 | 10/1988 |
| JP | 05-56621 | 3/1993 |
| JP | 08-295210 A | 11/1996 |
| JP | 2000-309255 A | 11/2000 |
| JP | 2001-513179 A | 8/2001 |
| JP | 2002-205627 A | 7/2002 |
| JP | 2002-272076 A | 9/2002 |
| JP | 2004161063 A | 6/2004 |
| WO | 99/30939 | 6/1999 |

* cited by examiner

Fig.8
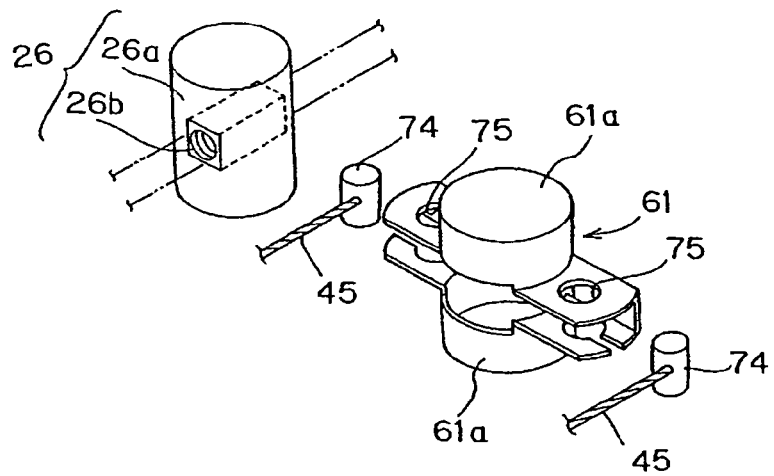
Fig.9a  Fig.9b
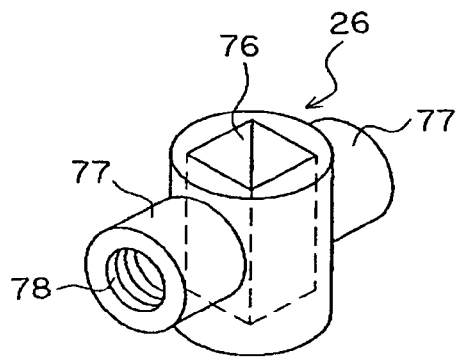 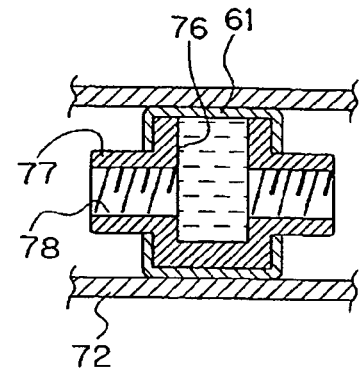
Fig.10
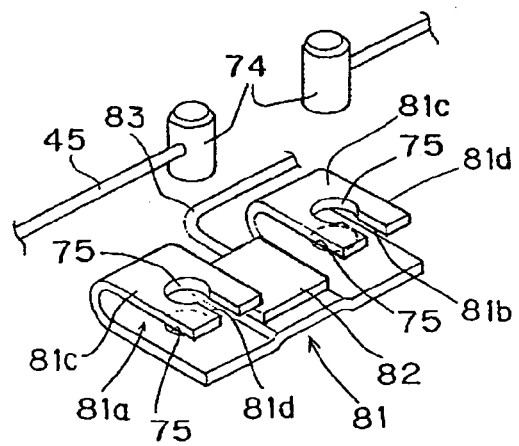

(a)

(b)

(c)

ELECTRIC CABLE DRIVE DEVICE AND ELECTRIC BRAKE DEVICE

FIELD OF THE INVENTION

This invention relates to an electric cable drive device and electrical brake device for automobiles using the said cable drive device. The automobiles include motorbikes, autocycles, power-assisted bicycles, golf carts, and forklifts.

BACKGROUND ARTS

Patent Document 1) Japanese Translation of PCT International Application No. 2001-513179
[Patent Document 2] Japanese Published Patent Application No. H8-295210
[Patent Document 3] Japanese Published Patent Application No. 2004-161063
[Patent Document 4] Japanese Published Patent Application No. 2602-205627
[Patent Document 5] U.S. Patent Specification No. 6386338
[Patent Document 6] Japanese Published Patent Application No. 2002-272076

In the Patent Document 1, a parking brake 200 for vehicles, as shown in FIG. 25, is disclosed. In this parking brake 200, a gear 201 is formed on the periphery and a spline hub is formed in its inner periphery, and therewith, it is provided with a component member 202 being supported rotatably and not moving axially, a hollow spline 203 which meshes with the inner periphery hub of the component member and is movable axially, and a male screw member (spindle) 204 which screws together with the female screw formed on the inner periphery of the spline. With the one end of spline 203, the first brake cable 205 is engaged, and with the one end of the male screw member 204, the second brake cable 206 is engaged. The outer periphery gear 201 of the component member 202 is driven by a motor M, and when the motor rotates in one direction, the female screw of the spline 203 and the male screw member 204 advance spirally relatively and the right and the left brake cables 205, 206 pull mutually, thereby the right and left brakes act.

On the other hand, when the motor M rotates in the inverse direction, the male screw 203 and the female screw member 204 of the spline 203 rotate relatively in the opposite direction, and the right and the left brake cables 205, 206 weaken the mutual tensile force, thereby releasing the brakes. Since a telescopic device composed of the spline 203 and the male screw member 204 is movable axially to the component member 202, the same forces are applied to the right and the left brakes. Thus, the parking brake of the Patent Document 1 can act or release the brake by the motor and can equalize the right and left brake force.

Further in the patent document 1, a disconnecting device 207 is disclosed which disconnects the connection between the second cable 206 and the male screw member 204 by remote control. This disconnecting device 207 is fixed to the end of the male screw member 204, and is provided with a guide member 208 guided by the inner surface of the housing, a lock release lever 210 energized clockwise by a spring 209, and a lock release cable 211 which rotates the lock release lever anti-clockwise opposing the energized force of the spring 209.

As shown in FIG. 26, to the shaft 212 supporting the lock release lever 210, an engaging claw 213 is connected so as to rotate together with the lock release lever. In the guide member 208, an engaging member 214 fixed to the end of the second cable 206 is accommodated movably in the axial direction, and in the engaging member 214, a groove 215 is formed with which an engaging claw 213 engages detachably.

This disconnecting device 207 can manually disconnect the connection between the cable 206 and the male screw member 204 by pulling the lock release cable 211 as shown in FIG. 12, when the electric system or the motor M is failed in a condition the brake being applied (in a condition the spacing between the right and the left cable being shorten). And when the electric system or the motor M is recovered, without pulling the lock release cable 211, by rotating the motor M so as to extend the spacing of the right and the left cable 205, 206, in other words, so as to move the guide member 208 left side, the engaging claw 213 can be engaged with the groove 215 enabling to recover the original condition.

In the Patent Document 2, as shown in FIG. 27, a parking brake control device for automobiles is disclosed, which is provided with a motor M and a shaft 221 rotatively driven via a gear 220. In the right and left of the shaft 221, the right screw 222 and the left screw 223 are formed respectively, and with those screws the nut members 224, 225 are screwed together. To those nut members, the one end of the brake cable 205, 206 is engaged respectively.

In this device, when the motor M rotates in one direction, the right and left nut members 224, 225 move toward the center side enabling to apply the right and left brakes. When the motor M rotates in the opposite direction, the right and left nut members 224, 225 move toward the outside enabling to release the brakes.

In the Patent Document 3, as shown in FIG. 28, an electrically driven parking brake 230 is disclosed, which is provided with a screw shaft 226 rotatively driven by a motor M, a nut member 227 screwed together with the screw shaft, an equalizer 228 provided on the nut in a condition capable of swinging, one pair of pulling cable 205, 206 connected to the equalizer, and a pulley 229 for converting the direction of the cable 205 180 degrees. Further in the Patent Document 3, it is described that a tension sensor TS is provided for detecting the tension of the other cable 206, and that the motor M is halted when the tension increases abnormally. The above mechanism is accommodated in the housing 231.

In the Patent Document 4, as shown in FIG. 29, an electric parking brake assembly 239 is disclosed, which is provided with an electric motor M having a output shaft 236, a transmission(speed reducer) 238 for connecting the output shaft 236 to a lead screw (screw) 237. To the lead screw 237, a drive nut 240 having a screw hole is screwed together, and to the drive nut 240, a cable 241 for brake operation is connected. The control module controls the electric motor based upon the signal indicating the cable tension such as the operating current of the motor, and a signal indicating the moving distance of the cable coming from the Hall effect sensor detecting the rotation number of the electric motor.

Further, in the Patent Document 4, an override gear 242 provided in the transmission 238 and an override cable 243 to rotate the override gear by manual remote control is disclosed. The override gear 242 can rotate the lead screw 237 via the transmission 238. The override cable 243 is composed of a so-called rotating cable having a flexible guide tube and a core accommodated in-the guide tube rotatably so as to be capable of transmitting torque.

Thereby, even when the electric motor halts, rotating the one end of the override cable 243 can apply the hand brake or release the brake. In the Patent Document 5, a structure belonging to the operation side in order to operate rotatively the end of the override cable 243 is disclosed.

In the Patent Document 6, a direct motor drive brushless motor is disclosed, which comprises a stator, a pulley provided rotatably around the stator shaft, a cuplike rotor which is provided with a drive magnet and rotates together with the pulley, a coil mounted around the stator shaft and disposed in the rotor, a sensor magnet provided inside of the front edge of the rotor, and a Hall sensor detecting the approach of the sensor magnet. This direct drive brushless motor is provided with one sensor magnet and twelve Hall sensors enabling multi pulse detection.

DISCLOSURE OF INVENTION

Since the parking brake device in the Patent Publication 1 is so made up that the telescopic device composed of the spline 203 and the male screw member 204 pulls the right and left brake cables 205, 206 each other, the tension of the both cable can be equalized enabling to save the space. However, it needs the spline hubs and the splines complicating the structure and makes the assembling work be troublesome. Further, in the case of releasing the engaging of the disconnecting device 207, because the lock release lever 210 is engaged strongly by the tension of the cable 206, it needs rather large labor to manually turn the lever. On the other hand, the brake control device of the Patent Publication 2 has relatively simple structure and can equalize the quantity of the right and left operation, but it is difficult to equalize the right and left braking forces.

The electrically driven parking brake device of the Patent Publication 3 can equalize the right and left braking forces by the equalizer 228, but the spacing between the right and left cable 205, 206 expands. Therefore, the housing becomes large requiring the wide mounting space. Further, when forces are applied to the two cables 205, 206, a large torque is applied to the housing 231, therefore the housing 231 and the mounting screw must have high strength.

In the electrically driven parking brake assembly of the Patent Publication 4, it is not apparent how the Hall effect sensor is provided, but in the case that a purchased DC motor is employed, a rotary encoder is composed in the speed reducer by mounting a magnet on a rotating member such as an intermediate gear (or final gear connected to the lead screw) for two stage speed reduction in the transmission, and by providing a Hall effect sensor on the gear housing. In this case, high precision detection of the quantity of the movement of the cable can not be achieved without providing many Hall effect elements and magnets for detection, thereby the composition of the rotary encoder and the speed reducer becomes complicated increasing the number of parts and man-hour of the manufacturing work.

In the electrically driven parking brake assembly 219 of the Patent Publication 4, since no more operation than to rotate the override gear 242 in the speed reducer by rotating the override cable 243 is necessary, the operating physical force is needed not to be strong, but many rotations are needed making it troublesome in the case of manual release of the brake.

This invention is directed to provide an electrically driven cable device and electric brake device which can make the operation be high precision. Further, this invention is directed to provide a parking brake device which have simple structure and can make the right and left brake forces almost be equal, furthermore, no large torque being generated in the housing etc. when forces are applied to the right and left cables.

Further, this invention is directed to provide an electric cable drive device which can manually release the brake easily when electric systems or motors failed, and furthermore has an emergency release mechanism of simple composition.

In addition, this invention is directed to provide an electrically driven cable device and electric brake device in which noise generation is small.

The cable drive device of this invention comprises; a motor; a speed reducer connected to an output shaft of the motor; a rotating member connected to an output shaft of the speed reducer; a transducer converting a rotation of the rotating member into a linear motion of a linear motion member; a cable connected to the linear motion member; and a detecting means detecting an amount of operation of the cable, wherein, the detecting means comprises a conversion means which counts pulses from an output of a pulse generating means generating pulses in proportion to a rotation of the motor, and converts into an amount of operation of the cable.

The second aspect of the electrically driven cable device comprises; a motor; a speed reducer connected to an output shaft of the motor; a rotating member connected to an output shaft of the speed reducer; a transducer converting a rotation of the rotating member into a linear motion of a linear motion member; a cable connected to the linear motion member; a load detecting means detecting a tension of the cable; and a control means transmitting a waning signal when an output of the load detecting means exceeds a given tolerable range.

In this case, the control means is preferable to be provided with a control means which halts the motor when the cable becomes unloaded in the cable paying out operation.

In these cable drive device, the cable can be the one which operates the parking brake of automobiles.

In the cable drive device, the rotating member of the transducer can be provided with a female screw, and the linear motion member can be a male screw which screws together with the female screw of the rotating member. Further, the rotating member of the transducer can be a male screw, and the linear motion member can be a nut member which screws together with the male screw. In the case that the linear motion member is the nut member, the nut member is preferable to be provided with an equalizer in a condition capable of swinging. And the nut member is preferable to be provided with a grease chamber.

Further in the electric cable drive device of this invention, the motor is preferable to be a brushless motor, and the pulse generating means is preferable to be for determining the excitation timing of the coil phase of the drive mechanism provided in a brushless motor.

In the second aspect of the electric cable drive device of this invention, the load detecting means is preferable to be provided with a strain gage. And the load detecting means is preferable to be provided with a spring which elastically deforms against the tensile force of the cable, and with a detecting means of the amount of deformation of the spring.

The third aspect of the cable drive device of this invention comprises; a motor; a speed reducer connected to an output shaft of the motor; a rotating member connected to an output shaft of the speed reducer; a linear motion member converting a rotation of the rotating member into a linear motion of a linear motion member, screwing together with the rotating member; a cable connected to the linear motion member; an emergency release mechanism releasing an operating physical force of the cable by an external operation, wherein the emergency release mechanism comprises a rotating means rotating the rotating member from outside.

In such cable drive device, the end of the rotating means is protruding from the housing of the speed reducer, and the rotating means to rotate the rotating member is preferable to be an engaging part having a square cross section provided on the protruding end of the rotating member.

The fourth aspect of the electric cable drive device of this invention comprises; a motor; a speed reducer connected to an output shaft of the motor; a rotating member connected to an output shaft of the speed reducer; a linear motion member converting a rotation of the rotating member into a linear motion of a linear motion member, screwing together with the rotating member; a cable connected to the linear motion member; an emergency release mechanism releasing an operating physical force of the cable by an external operation; wherein the emergency release mechanism comprises a constraining mechanism which constrains the rotating means so as not to move axially in a normal condition, and release the constraint by an external operation in an abnormal condition.

As for the constraining mechanism, it is preferable to comprise a catching mechanism which is disposed so as to face the end of the rotating member and receives and constrains the rotating member when its end is pressed against the constraining mechanism, and constrains the end until being released by an external operation, when its end is inversely pressed against the constraining mechanism.

The fifth aspect of the electric cable drive device of this invention comprises; a motor; a speed reducer connected to an output shaft of the motor; a rotating member connected to an output shaft of the speed reducer; a linear motion member converting a rotation of the rotating member into a linear motion of a linear motion member, screwing together with the rotating member; a control cable having an inner cable connected to the linear motion member and a guide tube supporting a reactive force of the inner cable; and an emergency release mechanism releasing the operating physical force of the inner cable by an external operation; wherein the emergency release mechanism comprises a constraining mechanism constraining an end of the guide tube so as not to move axially in a normal condition, and releasing the constraint by an external operation in an abnormal condition; and a releasing operation means releasing the constraint by an external operation.

In such cable drive device, it is preferable that the constraining mechanism comprises a bracket supporting an end of the guide tube; an engaging member moving between a constraining position which disturbs the movement by engaging with the bracket and a releasing position releasing the constraint by an external operation; and a spring which energize the engaging member to the side of constraining position, where the releasing operation means operates the engaging member toward the releasing position opposing the energized spring force. In this case, the engaging member is preferable to be provided as one pair tucking the centerline of the guide tube. Further, the releasing means is preferable to include a release cable which transmits the tensile force.

The sixth aspect of the electric cable drive device of this invention comprises; a motor; a speed reducer connected to an output shaft of the motor; a rotating member connected to an output shaft of the speed reducer; a linear motion member converting a rotation of the rotating member into a linear motion of a linear motion member, engaging with the rotating member; a control cable having an inner cable connected to the linear motion member and a guide tube supporting a reactive force of the inner cable; and an emergency release mechanism releasing an operating physical force of the inner cable by an external operation; wherein the emergency release mechanism comprises a holding mechanism which holds an end of the guide tube to be movable axially, holds the end in a position where it presses the guide tube in a normal condition, and moves the end to a position where the pressure is released by an external operation in an abnormal condition.

The holding mechanism can be composed of the bracket to hold the end of the guide tube, the rotating member connected to the bracket by screw-and-nut coupling, and an operating means to operate rotatively the rotating member from outside. In this case, the operating means is preferable to include a rotating cable.

In the case that the emergency release mechanism is provided, the control cable can be a pull control cable which operates the brake, and a tension by a return spring of the brake can be always applied to the inner cable of the pull control cable.

The seventh aspect of the cable drive device of this invention comprises; a motor; a speed reducer connected to an output shaft of the motor; a rotating member connected to an output shaft of the speed reducer; a transducer converting a rotation of the rotating member into linear motion of a linear motion member; a cable connected to the linear motion member; and where the speed reducer comprises a plurality of a rotating element and a wrapping connector drive element wrapped between those rotating elements.

In such electric cable drive device, the rotating element is preferable to be a pulley, and the wrapping connector drive element to be a belt. And the pulley is further preferable to be a geared pulley, and the belt to be a geared belt.

A parking brake device of this invention is provided with any of the above cable drive device, a brake lever to which the above cable is connected, the spring which energizes the brake lever to the release side of the brake, and a friction member for braking connected to the brake lever.

In the cable drive device of this invention, when the motor rotates in one direction, for example, in the direction to pull the cable, the rotating member rotates to drive the linear motion member in the direction of pulling the cable by the transducer. And when the motor rotates in another direction, it pushes the cable or weakens the pulling force, thereby enabling the reciprocating operation of the cable. Since the amount of the operation corresponds to the number of motor rotation (or the angle of rotation), the pulse generating means generates the pulses of which the number is in response to the amount of operation of the cable. Thereby, the converting means counts the number of pulses and converts into the amount of the cable operation, enabling high precision detection of the amount of the cable operation.

Since the second aspect of an electric cable drive device of this invention can detect the load applied to the cable, when excess loads are applied to the cable, it is possible to make the driver acknowledge the malfunction by a warning signal. And using the warning signal, appropriate actions can be taken such as to halt the motor. Thereby, safety of the object of the cable operation or device itself can be secured.

In the second aspect of an electric cable drive device of this invention, the device which stops the motor when unloaded in the driving out operation of the cable by detecting the tension of the cable, never drives out the cable excessively in the case that the permanent elongation of the cable occurs. Therefore, the slack of the cables is hard to occur, and no extra pulling operation is necessary when pulling the cable. Further, since the applied load to the cable can be detected, it is possible to take an appropriate action such as halting the motor immediately, thereby the safety of the object of the cable operation or the device itself is secured.

In the case that the cable for operating the parking brake of the automobiles, the enhanced -precision of the amount of cable operation enables the fine adjustment of brake force.

Therefore, the braking with the more suitable brake force compared with that of conventional electric parking brake devices can be done.

In the case that the rotating member of the transducer is provided with the female screw and the linear motion member is the male screw screwing together with the female screw of the rotating member, when the rotating member rotates as the motor rotates, the male screw screwing together moves axially. Thereby the cable connected to the male screw is operated toward the axial direction. Because the rotation is converted into the linear motion by the screw mechanism, a large speed reduction action (power intensifying action) is obtained in this portion also. The axial external force transmitted via the cable will not be converted into the rotative force, not affecting the speed reducer and the motor.

In the case that the rotation member of the transducer is the male screw and the linear motion member is the nut member screwing together with the male screw, when the male screw rotates as the motor rotates, the nut member screwing together with it moves axially. Thereby, the cable connected to the nut member is operated toward the direction of the axis. Because the rotation is converted into the linear motion by the screw mechanism, a large speed reduction action (power intensifying action) can be obtained in this portion also. The axial external force transmitted via the cable will not be converted into the rotative force not affecting the speed reducer and the motor.

In the case an equalizer is provided on the nut member in a condition capable of swinging, the two cables can be operated synchronously in pulling operation or slackening operation (pushing operation). And further, the difference of the operating physical forces of the two cables is absorbed by the equalizer allowing the two operational objects to be operated with equal forces synchronously.

In the case that the nut member is provided with a grease chamber, since grease can be always supplied to the part where the nut member and the male screw is screwing together, durability is enhanced. Further, by charging a large amount of the grease in the grease chamber, the interval of maintenance can be prolonged.

In the case that the motor is a brushless motor and the pulse generating means is the one for determining the excitation timing of the coil phase provided in the drive mechanism in the brushless motor, the rotation pulse generating means for determining the excitation timing of the coil phase previously provided in the brushless motor is efficiently utilized as the converting means which converts into the amount of cable operation by counting the output of the rotation pulse generating means. Therefore no separate pulse generating means such as a rotary encoder is necessary in the speed reducer, simplifying the composition. Further, since the rotation pulse generating means generates pulses responding to number of the coil phase per one rotation, even two to three pulses per one rotation of the motor generate several times of the pulse per the one rotation of the medium gear of the speed reducer corresponding to the speed reducing ratio. Therefore, the high precision detection of the amount of cable movement can be obtained.

In the second aspect of the cable drive device of this invention, when the load detecting means is provided with a strain gage, the load applied to the cable can be continuously detected with high precision based on the output of the strain gage. Therefore, the protection of the cables etc. can be performed more securely.

In the case that the load detecting means is provided with a spring which elastically deforms against the tensile force of the cable, and with a detecting means of the amount of the deformation of the spring, a load detecting means having a simple structure and being hard to be broken can be composed at a low price.

In the third aspect of the electric cable drive device of this invention, when the motor rotates, its rotation rotates the rotating member via the speed reducer, and further it is converted into the linear motion of the linear motion member screwed together with the rotating member. When the motor rotates inversely, the linear motion member moves to the inverse direction. Therefore, selecting the direction of motor rotation enables reciprocating operation in the axial direction of the cable connected to the linear motion member.

In case of failure in the electric system, the rotating means can be rotated using the rotating means in the emergency release mechanism. Thereby, the cable can be operated by moving the linear motion member. In this case, by screwing together of the rotating member and the linear motion member, the cable can be operated opposing the large load. Furthermore, it is possible to feel the cable tension and also the effectiveness of the brake under the resistance to rotate the rotating member. Accordingly appropriate manual operation can be performed.

In the case that the end of the rotating means is protruding from the housing of the speed reducer, and that the rotating means to rotate the rotating means is an engaging part having a square cross section provided on the protruding end of the rotating member, in an emergency such as the failure of electric system or motor, the rotating member is easily rotated enabling further easy manual operation of the cable by rotating with a tool with the engaging part having a square cross section protruding from the housing of the speed reducer.

In the forth aspect of the electric cable drive device of this invention, since the constraining mechanism of the emergency release mechanism constrains the rotating means so as not to move axially in a normal condition, when the motor and the speed reducer rotate, the rotating member rotates in the condition of not moving axially. Therefore, the linear motion member moves linearly enabling the cable operation opposing the load of the operated member.

In the emergency where the operated member being operated in one direction by the cable and the electric system break down, the constraint of the axial movement of the rotating member is released by operating the constraining mechanism with an external operation. Thereby, the rotating member and the linear motion member becomes movable axially to dissolve the condition being operated by the cable.

In the case that the constraining mechanism is disposed so as to face the end of the rotating member, and that it is provided with a catching mechanism which receives and constrains the rotating member when its end is pressed against the constraining mechanism, and when inversely pressed, constrains it until released by an external operation, the catching mechanism constrains the axial movement of the rotating member in a normal condition. Thereby the rotating member can operate the cable with the linear motion member opposing the reactive force of the cable operation. In an emergency, the constraint of the rotation member by the catching mechanism is released by an external operation, thereby the operating physical force of the cable being dissolved. Since the operation at the time does not need the rotation of the rotation member, it has a merit to be capable of dissolving the operating physical force of the cable easily within a short time.

In the case that the electric system failure is recovered at the condition in which the constraint of the rotation member by the catching member is released, the motor is rotated to rotate the rotation member. In this case, the rotation member rotates against the linear motion member and the rotation member is pressed to the catching member side, thereby it is easily returned to the former constrained condition.

In the fifth aspect of the electric cable drive device of this invention, when the motor rotates, its rotation rotates the rotating member via the speed reducer, and further, the rotation is converted into the linear motion of the linear motion member screwed together with the rotating member. When the motor rotates inversely, the linear motion member moves inversely. Therefore the selection of the direction of the motor rotation can energize the inner cable connected to the linear motion member reciprocatingly in the axial direction. Since in a normal condition the guide tube is constrained its axial movement by the constraining mechanism, the guide tube can hold the reactive force of the inner cable, and the axially applied energy of the inner cable is transmitted to the operated member enabling the motor to operate the operated member via the inner cable.

In an emergency such as the failure of electric system, the releasing operation means is operated from outside to release the constraint. Thereby, the guide tube cannot hold the reactive force of the inner cable dissolving the operating physical force to the operated member (the object of operation).

In the case that the constraining mechanism is provided with a bracket to support the end of the guide tube, an engaging member which moves between the constraining positions and the release position permitting the movement, and a spring which energize the engaging member to the side of constraining position, and wherein the releasing operation means operates the engaging member toward the release position opposing the energized spring force, in an emergency, the releasing operation means moves the engaging member toward the release position opposing the applied energy of the spring. In this moment, the spring stores the energy while being elastically deformed. Therefore, when the electric system failure is recovered, using the restoring force of the spring, the claw is moved toward the constrained position side enabling easy return to the former constrained condition.

In the case that the engaging member is provided as one pair tucking the centerline of the guide tube, the force to engage the bracket comes to the center of the guide tube enabling easy balancing of the force. And in the case that the releasing operation means is the releasing cable which transmits the tensile force (claim 4), it is easy to operate from a remote position.

In the sixth aspect of the cable drive device of this invention, since in a normal condition, a holding mechanism holds the guide tube in a position where it presses the guide tube, it is possible to operate the operated member by pulling and pushing operation of the inner cable. In an emergency, by moving the guide tube to the position where the pressure is released, the tension of the inner cable can be released.

In the case that the holding mechanism is provided with the bracket to hold the end of the guide tube, the rotating member connected by screw-and-nut coupling to the bracket, and an operating means to operate the rotating member from outside, by operating the rotating means with the operating means, the position of the bracket can be moved to make the guide tube being pressed or the compressing force being released. In the case that the operating means is provided with the rotating cable, the position of the bracket can be moved by remote control.

In the case that the control cable is a pull control cable which operates the brake, and that a tension by a return spring of the brake is always applied to the inner cable of the pull control cable, by the one way rotation of the motor, the rotating member is rotated so as to be capable of pulling the inner cable, and by another way rotation of the motor, it is possible to weaken the pulling force of the inner cable so as to pay out the cable according to the applied energy of the return spring. And in case of the electric system failure in the condition the inner cable being loaded with a large tension, the above described emergency release mechanism can dissolve the tension of the inner cable to dissolve the operating condition of the operated member.

Since the electrically driven brake device of this invention is provided with the above described emergency release mechanism, it is possible to apply the brake or to release the brake by pulling operation of the cable with the motor drive. And even in case of the electric brake system failure in the condition the brake being applied, it is possible to dissolve the tension of the cable by manual operation with the emergency release mechanism to release the brake, allowing the automobiles etc. to move. Further, even in a condition the braking by the cable being not capable, usually a service brake such as oil brake can be usable, there is no problem for driving the automobiles.

In the seventh aspect of the cable drive device of this invention, when the motor rotates in one direction, for example, in the direction of pulling the cable, the rotating member rotates to drive the linear motion member in the direction to pull the cable. And when the motor rotates in another direction, it weakens the force to push or to pull the cable, thereby enabling the reciprocating operation of the cable. And since the speed reducer is composed of the rotating member and the wrapping connector drive element, no gear meshes each other. Therefore noises generated by the speed reducer are small.

In the case that the rotating member is a pulley and the wrapping connector drive is a belt, generated noises are further small. And in the case that the pulley is a geared pulley and the belt is a geared belt, no slip occurs between the rotation of the motor and the transducer. Thereby the control of the motor is made to be secure. Further, detecting the rotation of the motor and the rotation of the geared pulley enables to detect the amount of operation of the cable. In addition, no grease is needed making it free from worry about the running out of grease.

In the case that the cable is the one which operates the parking brake of automobiles, even the engine is idling, the operation noise of the brake is indistinctive, accordingly uncomfortable feeling of the driver and fellow passengers is scarce.

Since the electrically driven brake device of this invention uses the above described cable drive device, the structure is simple and further the precision of the brake force control is high. And in the case that the load sensor is used, the safety can be enhanced. Further, in the case that the equalizer is used, the right and left brake force can be equalized. In the case that emergency release mechanism is provided, in case of the electric system failure, the brake can be released manually. In the case that the wrapping connector drive type speed reducer is used, noises can be reduced.

BRIEF DESCRIPTION OF DRAWINGS

FIG. 8 is a substantial perspective view of the equalizer and nut member in FIG. 6.

FIG. 9a is a perspective view showing the other embodiment of the nut member related to this invention, FIG. 9b is a cross section of the nut member.

FIG. 10 is a perspective view showing the embodiment of the load sensor used in the cable drive device of this invention.

BEST MODE FOR CARRYING OUT THE INVENTION

Figure 1:
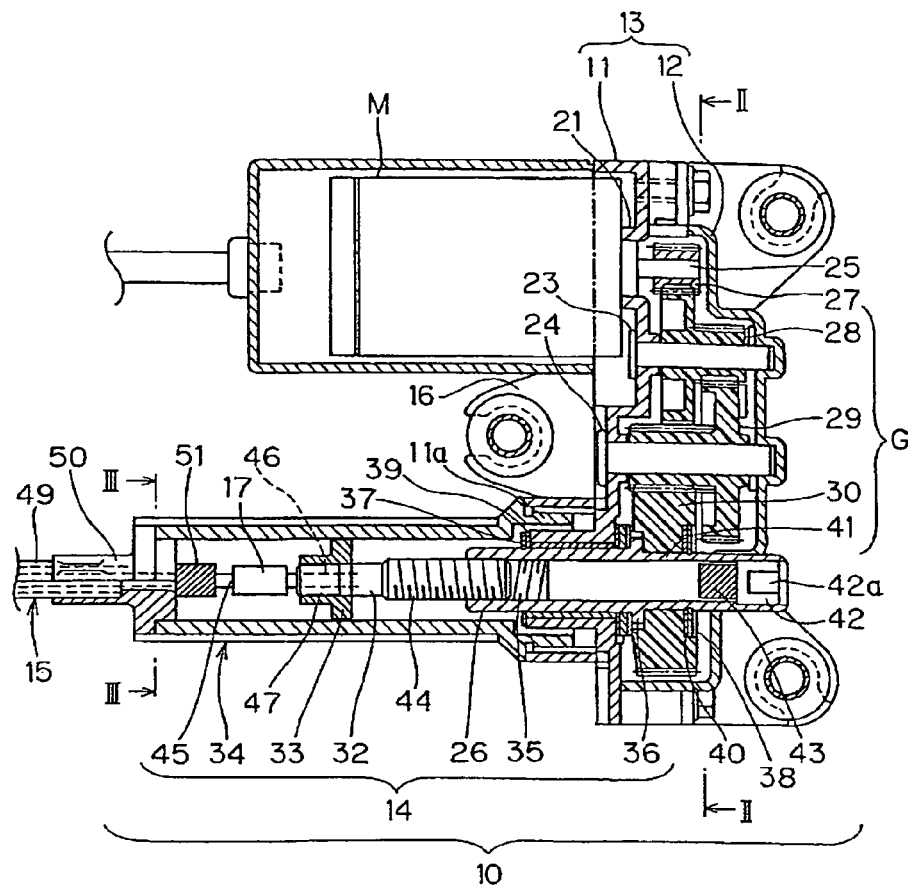
FIG. 1 is a partial cross sectional plane view showing an embodiment of the cable drive device of this invention.

The cable drive device 10 in FIG. 1 is provided with a housing 13 composed of a body 11 and a cover 12, a motor M mounted on the housing, a speed reducer G which reduces the speed of the motor rotation being accommodated in the housing 13, a screw-nut mechanism (rotation/linear motion transducer(or converter)) 14 connected to the output of the speed reducer, and a control cable 15 reciprocatingly driven by the screw-nut mechanism. The reference numeral 16 is a base bracket holding the housing 13, and the reference numeral 17 is a load sensor for detecting the load of an inner cable 45 of the control cable 15 by being intervened in the midway of the control cable 15. The load sensor can be omitted. However, as described later, its output is preferable to be used for the safety of the cable drive devices and various devices in which it is used, particularly for the safety of parking brake devices.

Figure 2:
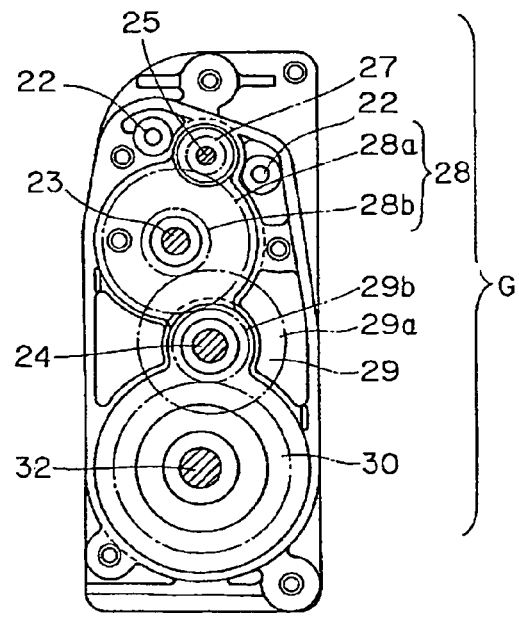
FIG. 2 is a II-II line cross section of FIG. 1.

In the body 11 of the housing 13, a mounting pedestal 21 for mounting the motor M is provided, and the motor M is fixed by screws (reference numeral 22 of FIG. 2). Between the body 11 and the cover 12, a first shaft 23, a second shaft 24 supporting the gear of the speed reducer are disposed in parallel with an output shaft 25 of the motor M, and they are fixed. Further, in the housing 13, the nut member 26 of the screw-nut mechanism 14 is supported rotatably. The rotation center of the nut member 26 is in parallel with the output shaft 25 of the motor M.

The speed reducer G comprises a pinion 27 fixed to the output shaft 25 of the motor M, the first gear 28 meshing with the pinion 27, the second gear 29 supported rotatably by the second gear 24 and meshing with the first gear 28, and the third gear 30 fixed to the periphery of the nut member 26 and meshing with the second gear 29. As shown in FIG. 2, the first gear 28 is provided with a large diameter gear 28a meshing with the pinion 27 and a small diameter gear 28b rotating together with the large diameter gear 28b. The second gear 29 is provided with a large diameter gear 29a meshing with the small diameter gear 28b of the first gear and a small diameter gear 29b rotating together with the large diameter gear and meshing with the third gear 30. In FIG. 2, to avoid vexatious complexity, the each gear is shown in only effective diameter by dashed lines.

In the speed reducer G, the rotation of the motor M is reduced respectively; when transmitted from the pinion 27 to the large diameter gear 28a of the first gear; when transmitted from the small diameter gear 28b of the first gear to the large diameter gear 29a of the second gear; and when transmitted from the small diameter gear 29b of the second gear to the third gear 30, achieving the three stage speed reduction totally. For example, when the gear ratio is 1/3 each, the total reduction ratio is 1/27.

Back to FIG. 1, the screw-nut mechanism 14 is provided with the nut member 26, a rod 32 screwing together with the nut member 26, a rectangular slider 33 fixed to the rod, and a guide member 34 guiding the slider 33 slidably in order to constrain the rotation of the rod. The nut member 26 presents a cylindrical shape and is supported rotatably by a cylindrical receptacle 11a provided on the body 11 of the housing. Inside of the front edge of the nut member 26, a female screw 35 is formed. On the periphery of the longitudinal central part, a flange 36 to support the thrust load in the cable operation, particularly the reactive force in pulling the cable is formed. In addition, the reference numeral 37, 38 is a C ring supporting the washer 39, 40 to receive the thrust load, and it is fitted to an annular groove formed around the periphery of the nut member 26.

In the inner periphery of the third gear 30, a square through hole for whirl-stop is formed, and on the surface of the nut member 26 fitting the third gear 30, four flat planes 41 fitting the through hole are formed. Further, the base end of the nut member 26, more specifically, the end opposite to the side where the female screw 35 is formed, protrudes from the cover 12. In this end, an engaging member 42 to perform the manual release operation of the brake is fixed by caulking etc. The engaging member 42 is provided with an engaging hole 42a having hexagonal cross section to fit so-called Allen wrench. Further, inside of the engaging member 42, a stopper 43 composed of rubber etc. is mounted.

Figure 3:
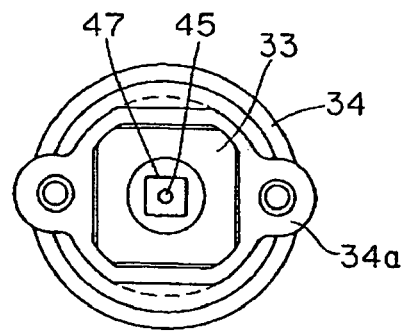
FIG. 3 is a III-III line cross section of FIG. 1.

In the vicinity of the rod 32, a male screw 44 screwing together with a female screw 35 of the nut member 26 is formed. At another end, a hole 46 for fitting in by caulking etc. the end of an inner cable 45 of a control cable 15 is formed. The perimeter of the hole is made to be a thin cylindrical part and is shaped into a square part 47 by being formed into square shape in caulking process. In the periphery of the square part, the slider 33 is fitted and fixed. The periphery of the slider 33 is, as shown in FIG. 3, made to be rough square shape and fitted to the inner surface of the guide member 34 slidably in the axial direction so as not to rotate. The base end of the guide member 34 is fitted and fixed to the periphery of the receptacle 11a provided on the body 11 of the housing.

The control cable 15 is a publicly known one composed of a guide tube 49 having flexibility and the inner cable 45 accommodated slidably in the guide tube. The guide tube 49 is composed of an armor layer, which is formed by thickly winding a metal wire having rectangular cross section and a sheath made of synthetic resin provided on the periphery. There is sometimes a case that a tube like liner made of synthetic resin is provided on the inner surface. The inner cable 45 is the one made by twisting metal wires, and in this embodiment, the synthetic resin coat is provided around the periphery.

To the end of the guide tube 49, a tubular casing cap 50 is fixed by caulking etc. and a flange part provided on the casing cap is fixed to the flange part (reference numeral 34a of FIG. 3) of the free end of the guide member 34. In the end of the inside of the casing cap 50, a tubular cushion rubber 51 is provided. The end of the inner cable 45 is, as described above, fitted in to the hole 46 of the rod 32 and fixed by caulking etc. In this embodiment, as the control cable 15, a pull control cable transmitting the pulling force is employed. However, it may be a push control cable depending on the usage.

In the screw-nut mechanism 14 and the control cable 15 composed as described above, the nut member 26 rotates together when the third gear 30 rotates. The rod 32 screwed together with the nut member 26 relatively rotates against the nut member 26 and moves axially, because its rotation is constrained by the guide member 34 and the slider 33. Thereby the inner cable 45 connected to the rod 32 is operated toward the axial direction. In the screw-nut mechanism 14, since the rod 32 moves one pitch of the screw (a rate of one lead) when the nut member 26 rotates, the speed reducing action is achieved also in this mechanism.

Figure 4:
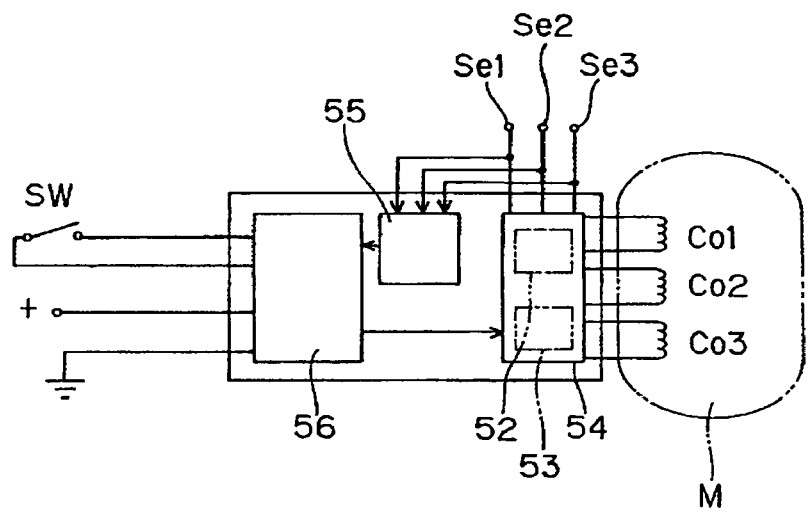
FIG. 4 is a block diagram showing the motor control circuit in the cable drive device of FIG. 1.

As the motor M, for example, a DC brushless motor provided with three phases of the coil phase is used. In the circuit shown in FIG. 4, between the rotor of the motor M and the fixed element (for example, the motor housing) facing the rotor, sensors Se1-3 for position detection in order to invert the excitation of the magnetic pole of the coils are provided.

For such a sensor, the combination of three magnets for detection and the Hall IC sensor (Hall effect element sensor) provided in the motor housing is suitable. In place of the magnets for detection, a driving magnet acting with the coil Col-3 can be used, which is simpler in composition. Other than three Hall IC sensors, sensors such as photo sensors can be used. The output of the sensor is sent to an amplifier 52 such as comparator, and a motor driver 54 provided with a commutating circuit 53 which inverts the magnetic pole of the coil.

In the cable drive device of this invention, the pulse output of the above sensor is sent to a cable operating position detection circuit 55, and the pulses are counted and converted into a signal indicating the cable position. The obtained cable position signal is sent fundamentally to a micro processor 56 so as to be a position signal of the object of the operation by the cable. And then, based on the operation switch for the brake on/off, various interlock signals, this signal generates the signals for controlling the normal rotation, halt, inverse rotation, rotation number of the motor M and rotates/halts the motor M via a motor driver 54.

The change of the cable reference position due to the permanent elongation of the inner cable, and the wear of the friction member for braking is calculated and stored with respect to each time or several times of the braking operation so as to be usable for suitable braking operations. In the case to compensate for the elongation of the inner cable, as described later, it can be so carried out that the motor is halted when the load sensor detects the unloaded condition in the paying out operation of the cable, the reference position of the cable position is reset to be zero therewith.

In the above cable drive device 10, when the motor goes into one rotation, the speed is reduced to 1/27 in the speed reducer rotating the nut member 26 at a rate of 1/27. Thereby the inner cable is operated 1/27 of the one pitch of the screw. If, for example, 10 each of the magnets for detection is provided on the second gear 29 and Hall IC elements for detecting those magnets are provided on the cover 12 of the housing, 10/9pulses are generated per one rotation of the motor M. However, when the exciting sensor accommodated in the motor is counted, even in the case of three pulses per one rotation of the motor M, by calculating 3/10×9, 2.7 times of the resolution is obtained.

Figure 5:
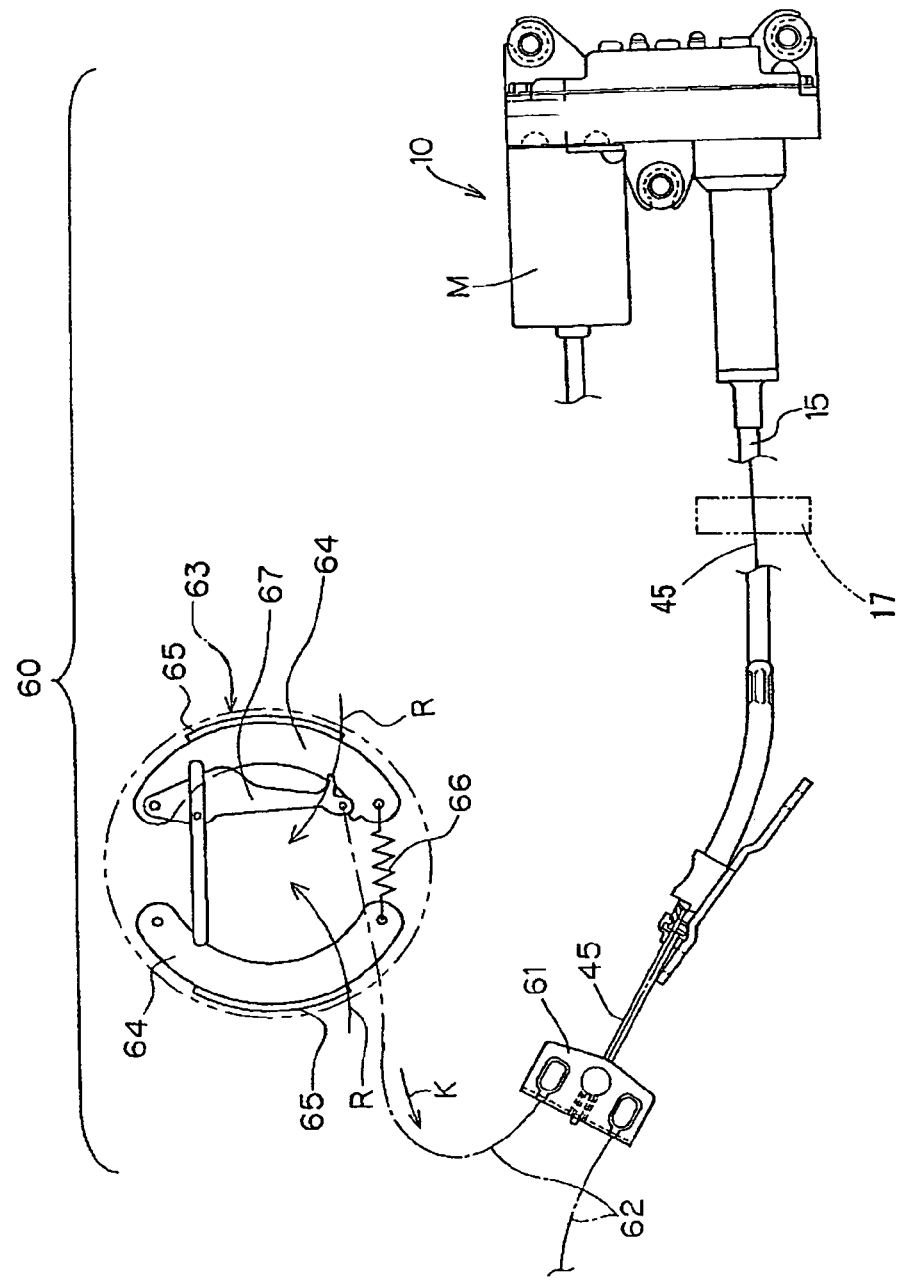
FIG. 5 is an outline plane view showing an embodiment of the electrically driven brake device using the cable drive device of FIG. 1.

Then, referencing FIG. 5, the embodiment of the electric brake device provided with the above cable drive device is described. This electric brake device 60 comprises the above cable drive device 10, the equalizer 61 connected to the other end of the inner cable 45 of the control cable 15 in a condition capable of swinging, the right and left second control cables 62, 62 connected to the equalizer, and a brake mechanism 63 connected to the other end of the second control cable 62. The brake mechanism 63 is publicly known one provided with a brake drum 64, a brake shoe 65 mounted to the brake drum, the return spring 66 which energize the brake drum 64 in the direction of pushing back (in the direction of the arrowhead R), and a parking lever 67 activated by the second control cable 62. The load sensor 17 can be intervened in the midway of the inner cable 45.

In the electric brake device 60, the brake drum 54 is in a condition of brake-release by the brake drum 64 being rotated in the direction of the arrowhead R with the energized force of the return spring 66 in a normal condition. When the driver makes the switch on, the motor M of the cable drive device 10 rotates in one direction rotating the nut member 26 of FIG. 1 to pull the rod 32 into inside of the nut member. Thereby, the inner cable 45 of the control cable 15 connected to the rod pulls the two second control cables 62 via the equalizer 61 of FIG. 5. Accordingly, the parking lever 67 rotates in the direction to act the brake (arrowhead K) applying the brake.

In this braking action, a halting signal is output by comparing with the previously stored data in the above cable operating position detection circuit to halt the motor. Further it is so composed that the output of the load sensor 17 of the cable is sent to the control circuit and the motor is halted when it exceeds a given upper value. When the above detection circuit of the amount of cable operation detects the position, and the load of the cable exceeds the given value despite of no movement of the cable to the position where the brake is applied, it is judged as a system failure and the warning signal is transmitted to make the driver acknowledge the failure with a warning lamp or warning buzzer.

In the case that the driver releases the brake, the switch (reference numeral SW of FIG. 4) is operated to rotate the motor inversely sending out the rod 32 from the nut member 26. Thereby, the inner cable 45 is pulled back by the energized force of the return spring 66 of the brake mechanism 63 via the inner cable of the two second control cables 62 of FIG. 5 and the equalizer 61. The timing to halt the motor M requires the condition that the brake is fully applied and no slack exists in the inner cable 45 etc. In the case that the load sensor 17 is provided, the above described control circuit halts the motor at the time when it is unloaded in the paying out operation of the cable. Therefore, in case of permanent elongation of the cable, no excess cable is paid out. Therefore, the slack of the cable is hard to occur, and then no excess cable pulling operation is necessary next time when the cable is pulled. Further, as described above, the control of the motor M of the cable drive device 10 is of high precision, the braking can be done suitably, suppressing the useless wear of the friction member, therewith suppressing wear-out due to the slack or excess tension of the inner cable 45.

Such an electric brake device as described above is usually used in the operation of parking brakes. But, it is preferable to be capable of being operated as an emergency brake in place of the service brake in an emergency. In the above embodiment, as the motor M, three phases brushless motor is used, but it may be a motor with brushes and also a motor with excitation more than three phases can be used.

In the case that a motor not provided with a pulse generating means inside such as brushed motors, it is preferable to provide a means to generate pulses with the rotation of the output shaft of the motor, or the gear of the reducer, the nut member etc. As such a pulse generating means, the combination of a detection magnet (one each of multi pole magnet fundamentally) used in rotation members such as rotation shafts and gears and Hall IC sensors (Hall effect element sensor) used in fixed elements such as casings are suitable.

The cable operation device of this invention can be used as an linear actuator pushing and pulling the cable for many usage other than braking operations. In the case that it is used by pushing and pulling the cable, a push-pull cable is used.

Figure 6:
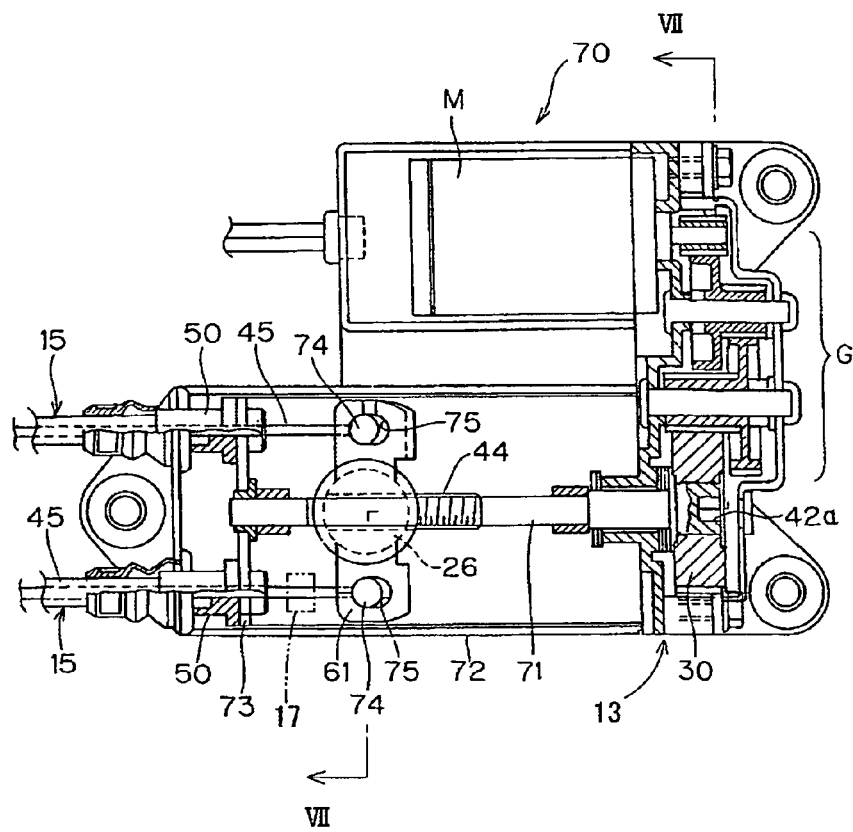
FIG. 6 is an outline plane view showing the other embodiment of the cable drive device of FIG. 1.
Figure 7:
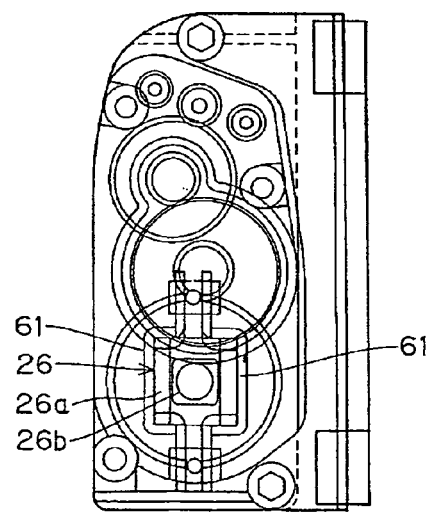
FIG. 7 is a VII-VII line cross section of FIG. 6.

The cable drive device 70 shown in FIG. 6 and FIG. 7 is provided with the screw-nut mechanism which carry out the pulling and pushing operation of the two control cables 15, 15 synchronously. Since the motor M and the speed reducer G is same as those in the cable drive device shown in FIG. 1 and FIG. 2, the description is omitted applying the same reference numerals. The load sensor 17 of the cable can be intervened in the midway of the inner cable 45 of the odd control cable 15. In this cable drive device 70, a male screw 44 is formed in the screw shaft 71 supporting the third gear 30, and the nut member 26 is screwed together with the male screw, composing the screw-nut mechanism with both of them.

The nut member 26 is, as shown in FIG. 7 and FIG. 8, composed of a cylindrical body 26a made of synthetic resin and a rectangular column like nut 26b made of metal being fixed to inside of the body by insert molding. The nut member 26 is, as shown in FIG. 7, embraced turnably by the bottomed cylinder part 61a of the equalizer 61. The equalizer 61 is, as shown in FIG. 8, a part made by folding or by drawing a metal plate and has a configuration of the two bottomed cylinder part 61a facing each other in its central part, and a configuration of the two metal plates disposed face-to-face in its upper end and lower end. The upper two metal plates are joined mutually. The bottomed cylinder part 61a of the equalizer 61 is guided by the inner surface of the guide member 72 slidably in the moving direction of the cable.

In the front edge of the tubular guide member 72 fixed to the housing 13, the guide tube of the two control cables 15, 15 is fixed by casing caps 50, 50. The one end of the casing caps 50, 50 enters into inside of the guide member 72, and to a supporting plate 73 is fixed to the front edges of the end. The supporting plate 73 supports the front edge of the screw shaft 71 rotatably. The front edge of the inner cables 45, 45 of the two control cables 15, 15 are engaged with the engaging holes 75, 75 formed in the upper end and lower end of the equalizer 61 by cable ends 74, 74 fixed to those front edges.

Since this cable derive mechanism 70 is capable of pulling operation and returning operation of the inner cables 45, 45 of the two control cables 15, 15 synchronously. Those control cables 15, 15 can be, as the two controls cables 15, 15 shown in FIG. 5, connected to the brake mechanism 63 directly.

FIG. 9a and FIG. 9b shows the case in which a grease chamber 76 is provided in the nut member 26. The grease chamber 76 opens toward the upper surface side, and a female screw 78 is formed in a protrusion 77 protruding before and behind. Since the nut member 26 is, as shown in FIG. 9b, constrained by the guide member 72 via the equalizer 61 so as not to turn, grease does not flow out even the grease chamber 76 opening toward the upper surface side is provided. Further, since the opening of the grease chamber 76 is closed by the equalizer 61, the grease is protected. In the cross section of FIG. 7, the right side of the figure is the upper side. It is the same in FIG. 2. But it can be made to be in other directions.

The grease may be semisolid or fluid. As described above, by the provision of the grease chamber 76, the lubrication interval of the grease can be largely prolonged, making the lubrication of the grease to the nut member 26 surrounded by the guide member 72 be relieved.

In the cable drive device 70 of FIG. 6, the load sensor 17 is provided in the inner cable 45 of the odd control cable 15. It is because the one-sided detection is adequate, as the tensions of the inner cables 45 of the both control cables are made equal by the action of the equalizer 61. However it is also possible to detect the tensions by averaging the both providing the sensors in the inner cables 45 of the both control cables 15.

FIG. 10 shows an embodiment of the load sensor intervened in the midway of the brake control cable (the inner cable 45 of FIG. 1 and FIG. 6). The load sensor 80 of FIG. 10 can be composed of commercially available strain gages, and is provided with a plate 81 to which the inner cable is connected, a strain gage 82 mounted on the surface of the plate 81, and an electric wire 83 extending from the strain gage 82. Further, in the both end of the plate 81, the engaging parts 81a, 81b for engaging the cable ends 74 are formed and bonded by die casting to the end of the inner cables 45.

These engaging parts 81a, 81b are formed by folding the part extending from the both end of the plate 81 with the space left between. An engaging hole 75 for engaging the cable ends 74 formed by die-casting is formed in the corresponding parts of the folded upper plate 81c and the original plate (lower plate). The engaging hole 75 of the upper plates 81c are communicated with outside by laterally extending groove 81d. The midway of the plate 81 may be made thin so as to be extendable elastically by the tension applied to the cable.

In this load sensor 80, the electric resistance of the strain gage 82 varies when the plate 81 deforms corresponding to the elastic extension by the load applied to the cable. The load can be detected by measuring the variation with Wheatstone bridge etc.

Figure 11:
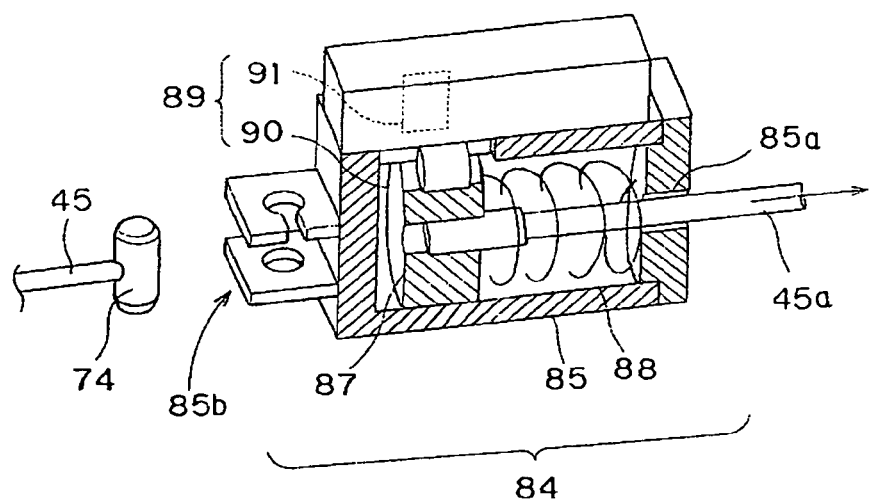
FIG. 11 is a partial cross sectional perspective view showing the other embodiment of the load sensor used in the cable drive device of this invention.

The load sensor 84 shown in FIG. 11 is provided with a box like case 85, a cable 45a or rod accommodated in the case movably in the axial direction, a piston like engaging member 87 fixed to the front edge of the cable 45a, a compressing spring 88 intervened between the engaging member 87 and the inside of the case 85 and disposed around the cable 45, and a position sensor 89 detecting the relative position of the engaging part 87 against the case 85. As the position sensor 89, a magnet 90 mounted on the engaging part 87 and the Hall IC 91 mounted on the case 85 can be cited. Limit switches can be also used. In the case of FIG. 11, as the compressing spring 88, a helical compressing spring is employed. However, a large number of superposed conical springs can be employed. In the one end of the case 85, a through hole 85*a* is formed to pass through the cable 45*a*.

In the stroke detecting type load sensor 84 composed as described above, the engaging part 85*b* is provided in the other end of the case 85 or in other portion, and the inner cable 45 of the cable 15 for the brake operation is engaged by the cable end 74. Another end of the cable 45*a* is connected to the end of the rod 32 of FIG. 1 with a male screw or to the slider 33. In the case of FIG. 6, the cable end 74 is bonded to the end of the cable 45*a* and connected to the equalizer 61. Thereby, the tension of the inner cable 45 operating the brake can be detected by the load sensor 84.

More specifically, when the tension applied between the rod 86 and the inner cable 45 is small, the engaging member 87 moves toward the right side of FIG. 11 by the action of the compressing spring 88. And, when a large tension is applied to the inner cable 45, the engaging member 87 moves toward the left side of FIG. 11 opposing the applied energy force of the compressing spring 88. Thereby, the Hall IC 90 detects the magnetism of the magnet 91 enabling the detection of the excess loading or unloading of the inner cable 45.

The load sensor 80, 84 of FIG. 10 and FIG. 11 can be used as the load sensor 17 intervened in the midway of the inner cable 45, for example, in the cable drive device 10 of FIG. 1 and the cable drive device 70 of FIG. 10. Thereby, whether an excessive large tension is applied or not to the inner cable 45 in the parking bake operation can be detected. When such excessive large tension is detected in the braking operation, the motor M is halted temporarily. And when the excessive load still remains in further two or three times braking operations, a trouble being assumed to have occurred, and an indicating lamp may be lighted or a buzzer may be sounded to make drivers acknowledge. Further, the motor M may be halted.

In the above embodiment, the load sensor 80, 84 is intervened in the midway of the cable (the inner cable 45), but it can be intervened between the rod 32 of FIG. 1 and the inner cable 45, or between the inner cable 45 of FIG. 6 and the equalizer 61. Further in the above embodiment, the load sensor is provided inside of the housing 13 of the cable drive mechanism, but it can be provided outside. However, it is preferable to be provided inside of the housing 13 for the protection of the load sensor.

Figure 12:
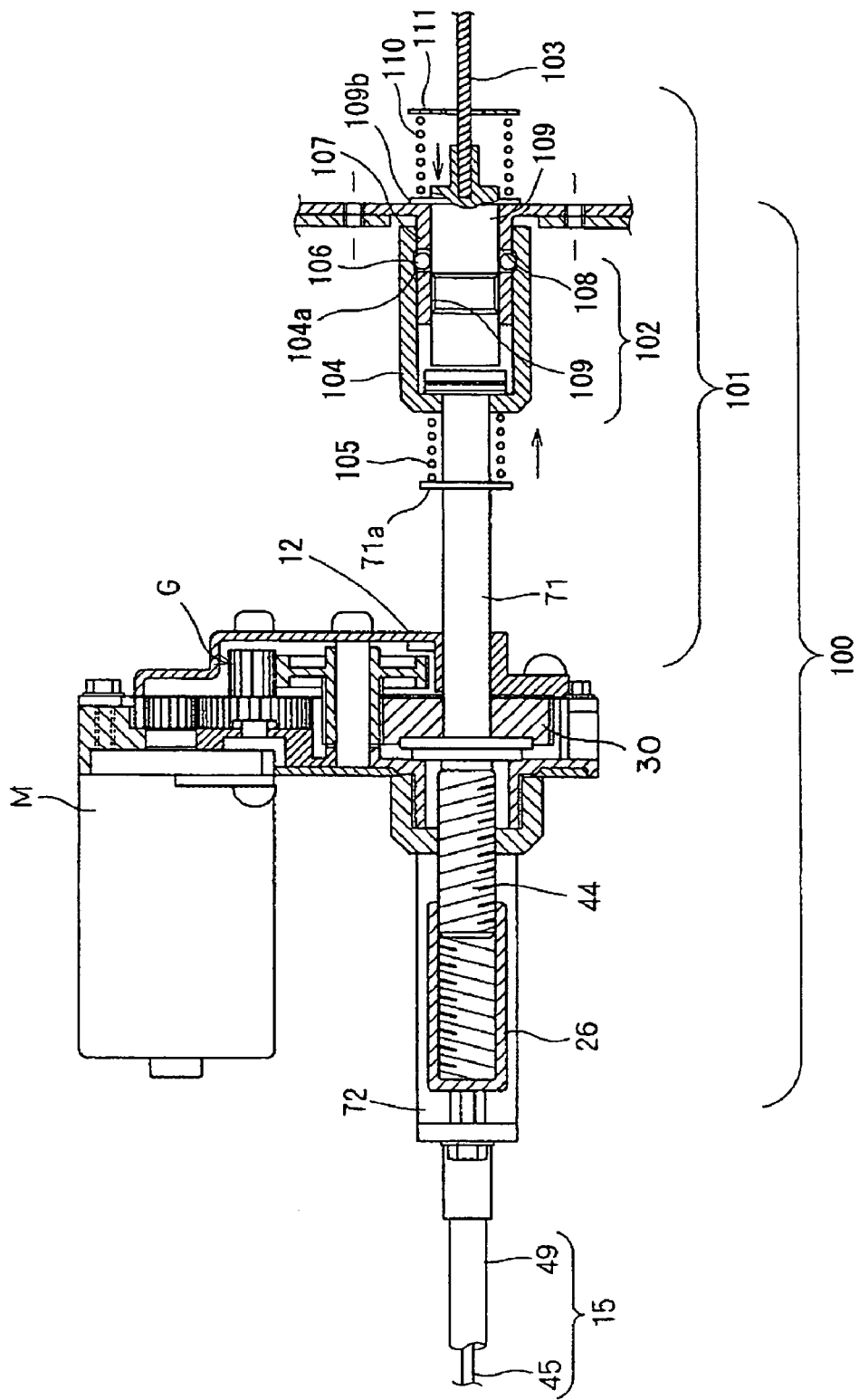
FIG. 12 is a partial cross sectional plane view showing the other embodiment of the cable drive device of this invention.

The cable derive device 100 of FIG. 12 is provided with an emergency release mechanism (emergency mechanism) 101 which can be remote controlled. This emergency release mechanism 101 is used for the cable drive device 10, 70 of FIG. 1 or FIG. 6 etc. The fundamental composition of this emergency release mechanism 101 is same as that of the cable drive device 10 of FIG. 10, wherein the screw shaft 71 is rotated via the motor M and speed reducer, and wherein the nut member 26 screwing together with the screw shaft is driven to do linear motion (or translatory movement) carrying out the pull operation and paying out operation of the inner cable 45 of the pull control cable.

In this emergency release mechanism 101, the screw shaft (rotating member) 71 is so composed that it is movable in the axial direction between the normal position apart from the cable and the release position near the cable side. Such composition is realized by connecting the third gear 30 and the screw shaft 71 by a spline etc. to be movable in the axial direction and to be transmittable of the torque. Further, this emergency mechanism 101 is provided with a catching mechanism 102 which constrains the screw shaft 71 in the normal position while permitting rotation, and in emergency, moves the rotating member screw shaft 71 to the release position, and further provided with a means to remotely control the catching mechanism 102, for example, a release cable 103 composed of a pull control cable.

In the embodiment of FIG. 12, the rotating member is the screw shaft 71, and the linear motion member is the nut member 26. But as shown in the case of FIG. 1, the rotating member can be made to be the nut member 26 and the linear motion member to be the rod 32 provided with the male screw. In this embodiment, the one end of the screw shaft 71 is protruded from the housing (or cover 12) of the speed reducer G, and on its end part the bottomed cylinder shaped catching member 104 is provided movably in the axial direction and rotatably, and the catching member 104 is energized by the first spring 105 so as to be protruded from the end of the screw shaft 71.

As the first spring 105, a helical compressing spring etc. is used, one end of which is engaged with the catching part 104 and another end is engaged with a C ring 71*a* etc. provided on the screw shaft 71. Inside of the catching part 104, a concave part 104*a* into which a part of a ball 106 enters is formed. The concave part 104*a* is formed in annular shape and its end is tapered so as to make the ball be easy to run on.

In the stationary portion of an automobile body, a cylindrical ball holding member 107 fitted to the periphery of the catching member 104 slidably is provided. In the ball holding member 107, a plurality of through hole 108 accommodating the ball 106 is provided, in which the above balls 106 are accommodated. The balls 106 may be common steel balls.

Inside of the ball holding member 107, a control rod 109 is accommodated slidably in the axial direction. On the periphery of the control rod 109, a concave groove 109 to accommodate a part of the balls 106 is formed. The concave groove 109*a* is formed in annular shape and the end of which is tapered so as to make the ball 106 run on easily. To the end of the control rod 109, one end of the release cable 103 for remote control is connected. The release cable 103 or the control rod 109 is energized by the second spring 110 toward the left side of FIG. 12. The second spring 110 is, for example, a helical compressing spring, one end of which is engaged with the flange part 109*b* of the control rod 109 and another end is engaged with a stationary member 111. In addition, a helical extension coil spring can be also used.

In the emergency release mechanism 101 composed as above, in a normal condition, the release cable 103 is not pulled as shown in FIG. 12 (and the first process S1 of FIG. 13), and the control rod 109 is moved toward the left side according to the energizing force of the second spring 110. Therefore, the ball 106 runs on the periphery of the control rod 109, and a part of it enters into the concave part 104*a* of the catching member 104. Thereby, the screw shaft 71 is constrained at the right side of FIG. 7, namely at the normal position. Therefore, the rotation of the motor M is transmitted to the screw shaft 71 via the speed reducer G to operate the nut member 26 via screw-coupling to the axial direction. Thereby, the inner cable 45 of the pull control cable can be operated in pulling and releasing operation enabling to drive electrically operate the braking and the operate the releasing, for example, the parking brake.

Figure 13:
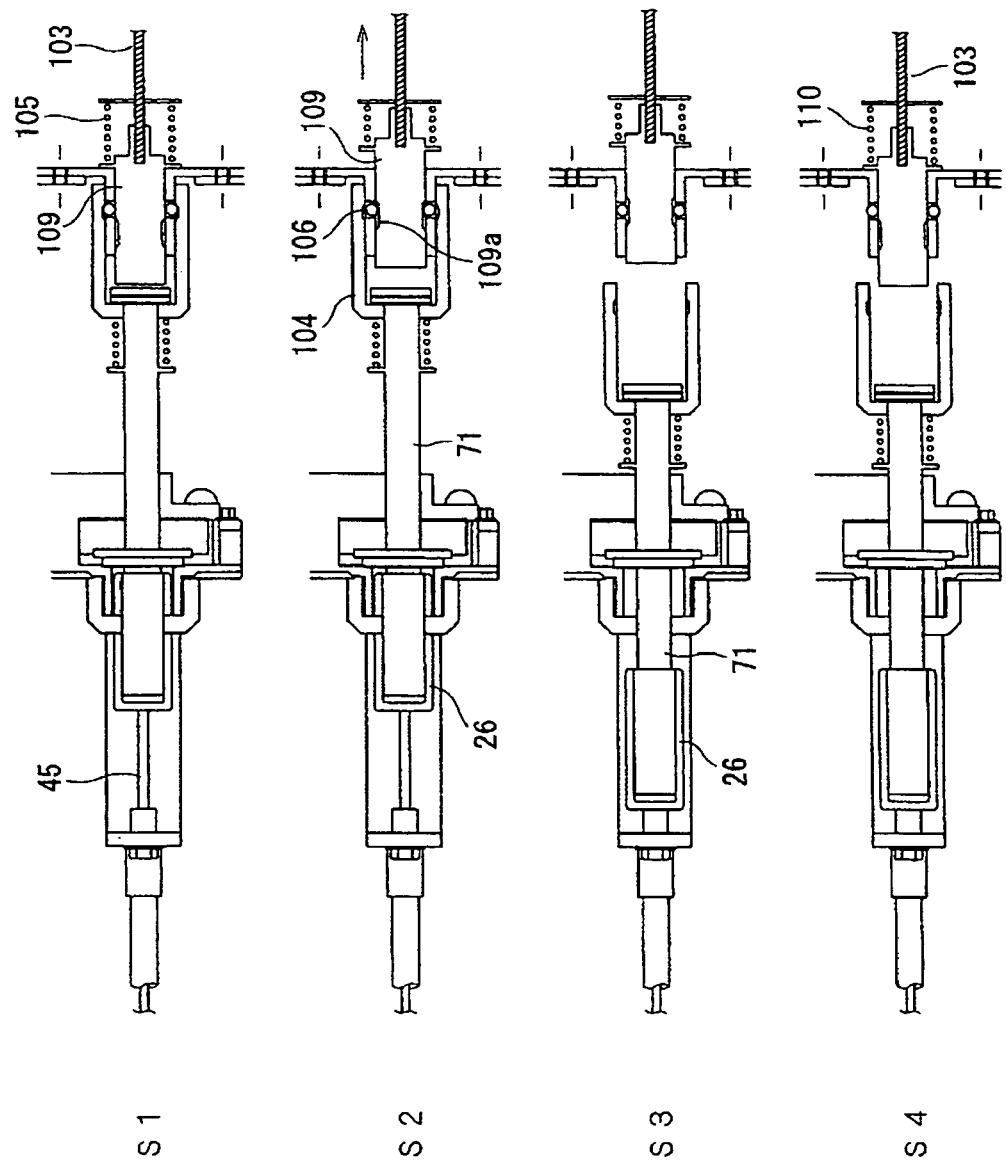
FIG. 13 is a process drawing showing the action of the emergency release mechanism in the cable drive device of FIG. 12.

In an emergency such as the electricity applied on the motor M stops in a condition of the brake being applied, the release cable 103 is pulled toward right side of FIG. 12 opposing the energized force of the second spring 115. Thereby, as the second process S2 in FIG. 13, the control rod 109 is pulled making the ball 106 fall in the concave groove 109a of the control rod 109. Thereby, the engaging between the ball 106 and the catching part 104 is departed making the screw shaft 71 and the nut member 26 screwed together with it movable in the axial direction. Accordingly, the object of the operation of the cable 15, for example, the action of the parking brake is released. The third process S3 in FIG. 13 shows the condition in which the cable in the return spring of the brake side is pulled and the screw shaft 71 and the nut member 26 are moved toward the left side. Thereby, the automobiles can be driven or be moved by pushing manually.

Figure 14:
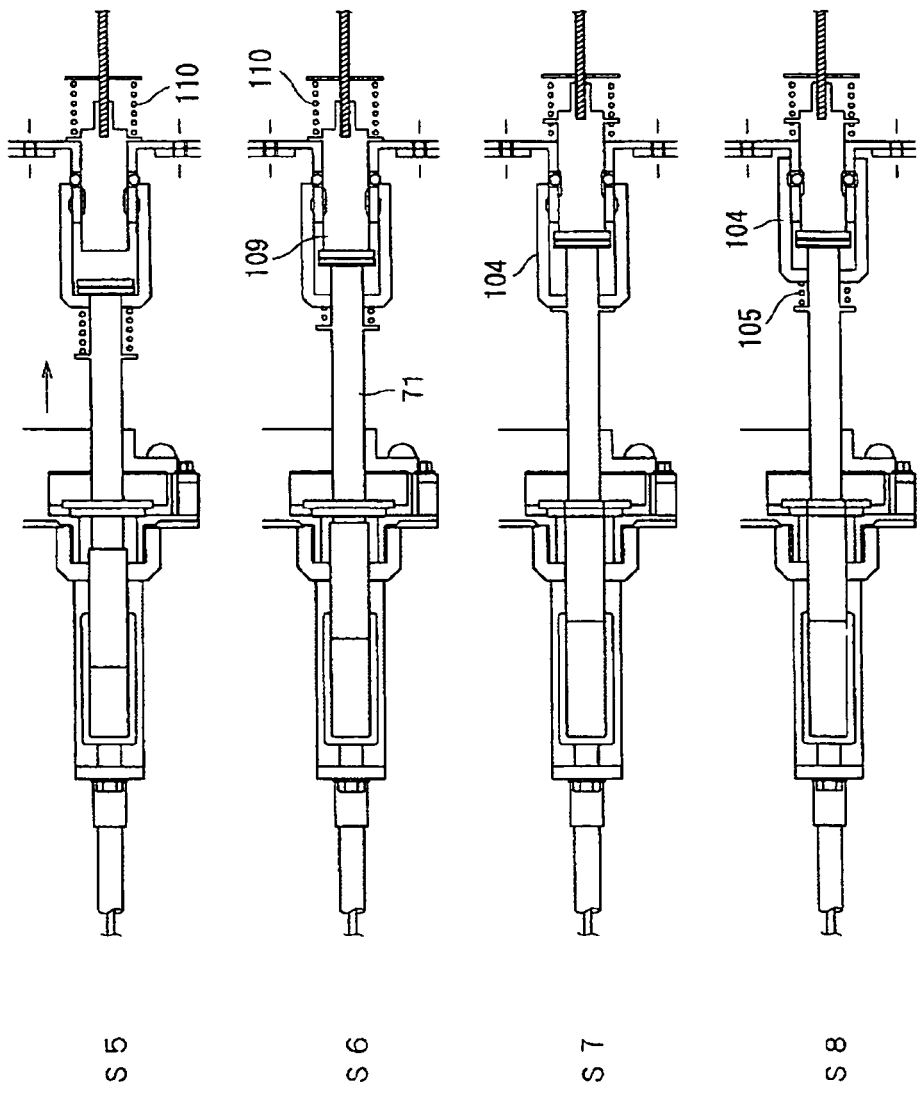
FIG. 14 is as process drawing showing the action of the emergency release mechanism continued from FIG. 13.

The pulling operation of the release cable 103 is usually done by the driver with an at hand lever. But it can also be done by other means such as solenoid actuators having separate electric systems. After the application of electricity to the motor M is recovered, as shown in the forth process S4 of FIG. 13, the pulling force of the release cable 103 is weakened to make the control rod 109 move left side by the energized force of the second spring 110. Thereby, the ball 106 again runs on the surface of the control rod 109. In this condition, the motor M is rotated in the same direction as that of the brake releasing. In this case, since the screw shaft 71 is movable in the axial direction, the nut member 26 cannot move toward the right side opposing the energized force of the return spring, and contrary the screw shaft 71 moves toward the right side (the fifth process S5 of FIG. 14).

At this moment, the catching member 104 fits to the periphery of the ball holding member 107, and the catching member 104 does not move any longer even the end of the catching member 104 contacts the ball 106. It is because the ball 106 is riding on the surface of the control rod 109. And then, the screw shaft 71 only moves toward the right side opposing the second spring 110, and its front edge contacts the front edge of the control rod 109 (the sixth process S6). And further, when the screw shaft 71 rotates, the screw shaft 71 pushes the control rod 109 into the right side opposing the energized force of the first spring 105 (The seventh process S7). And, when the control rod 109 withdraws right side, the ball 106 enters into the concave groove 109a of the surface of the control rod 109. Thereby, the catching member 104 fits the periphery of the ball holding member 107 deeply, resulting in the catching member 104 to cover the periphery of the ball 106 (The eighth process S8). After that, it returns to the normal parking brake operation, and the brake can be applied by rotating the motor M in the direction of braking, namely in the direction of pulling in the cable 15, and the brake can be released, by rotating inversely, In the above embodiment, the catching member 104 is provided to the screw shaft 71 slidably in the axial direction and rotatably. But it can be so composed that the catching member 104 is provided so as not to rotate against the screw shaft 71 and to permit the rotation between the catching member 104 and the ball 106. Further, the catching member 104 covers the periphery of the ball holding member 107 and the control rod 109 is inserted into the inner perimeter of it. But the catching member 104 can be inserted into the inner perimeter of the ball holding member 107, and the cylindrical control member can be provided on the periphery of the ball holding member 107.

Figure 15:
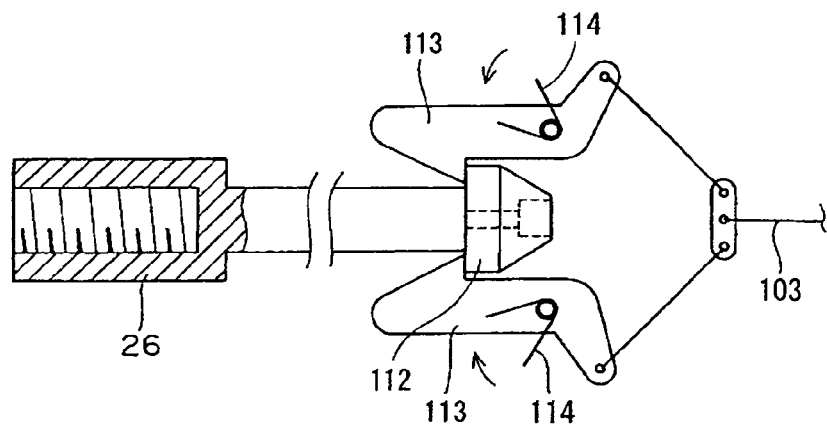
FIG. 15 is an outline side view showing the other embodiment of the catching mechanism related to this invention.

Further, in the above embodiment the catching member 102 utilizing the ball 106 can be used, but the catching member can be also composed of one pair of claw member etc. which closes elastically. For example as shown in FIG. 15, it can be so composed that an engaging member 112 provided in the end of the rotating member such as the screw shaft or the tubular nut member 26, is gripped by one pair of the claw member 113. And the claw member 113 is energized by a spring 114 in the direction to grip always. Further, it is preferable to provide a tapered surface on the claw member 113 or the engaging member 112 so as to make the end of the engaging member 112 pushes aside the claw member 113 opposing the energized force by the spring 114 when the end of the engaging member 122 returns from the disengaged condition. And the release cable 103 is composed to be capable of operating so as to expand the claw member 113.

In the cable drive device 100 of FIG. 12, the pulling operation of the release cable 103 operates the constraint/release of the movement in the axial direction of the screw shaft 71, but other mechanisms including electrically driven means may be used to remotely operate the constraint/release of the movement in the axial direction of the screw shaft 71. Further, being a temporary operation in an emergency, it can be so composed that drivers or passengers directly operate the rod 109 etc. without use of remote control means such as the release cable 103 etc.

Figure 16:
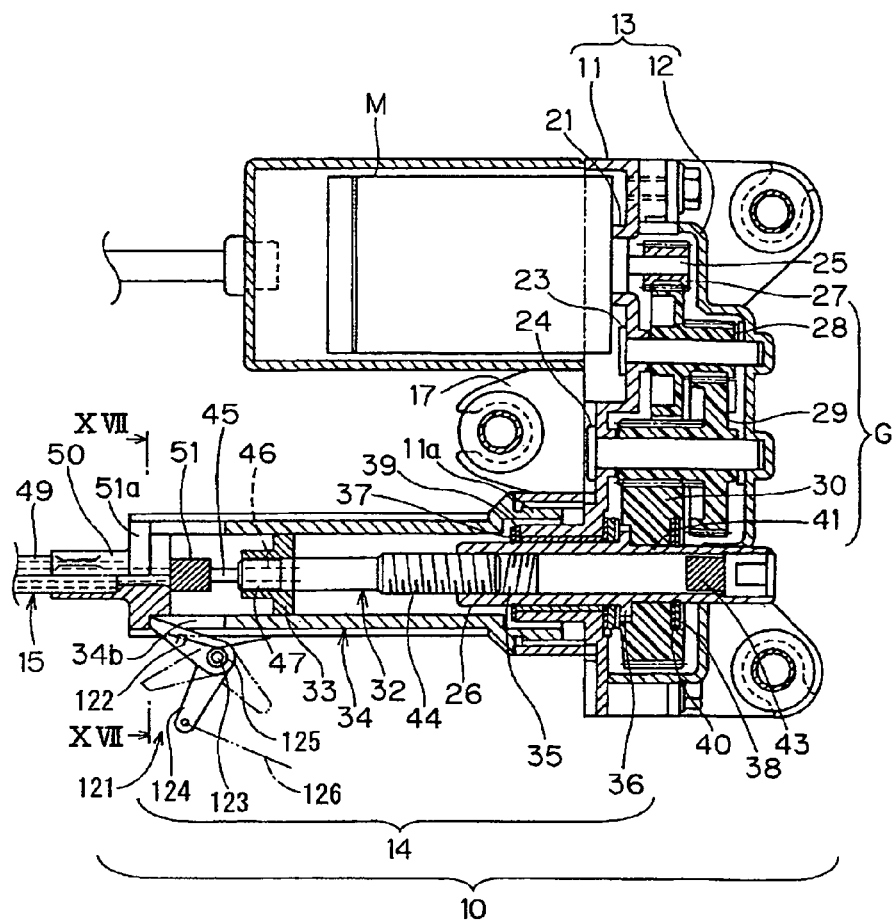
FIG. 16 is a partial cross sectional plane view showing further the other embodiment of the cable drive device of this invention.
Figure 17:
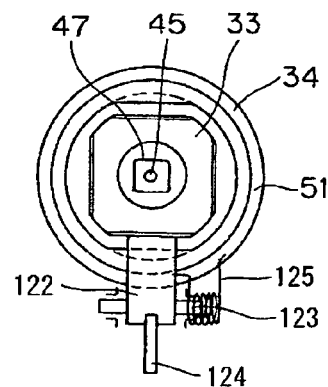
FIG. 17 is a XVII-XVII line cross section of FIG. 16.

The cable drive device 120 shown in FIG. 16 is fundamentally same as the cable drive device 10 of FIG. 1, but is provided with an emergency release mechanism 121 of claw-catching type. More specifically, a notched groove 34b extending axially is formed in the vicinity of the free end of the guide member 34, and in its vicinity, the engaging member 122 is supported by the housing 13 rotatably (see FIG. 17). In the engaging member 122, a supporting rod 123 and operating piece (operating lever) 124 extending toward the outside in the axial direction from the turning center are provided. The engaging member 122 extends toward an oblique direction from the supporting member 123 and its front edge is engaged with the inside surface of a bracket 51a. The engaging member 122 is energized by such a spring 125 as helical coil spring in the clockwise direction of FIG. 16. In a normal condition, the front edge of the engaging member 122 constrains the right side movement in FIG. 16 of the bracket 51a by engaging with the bracket 51a. When engaging member 122 is turned anti-clockwise by operating the operating lever 124, the constraint is released.

In other words, the engaging member 122 and the spring 125 is a constraining mechanism to constrain the axial movement of the bracket 51a, and the operating piece 124 is a releasing operation means to release the constraint. The engaging member 122, spring 125 and the operating piece 124 composes the emergency release mechanism 121 as a whole. In addition, the release cable 126 for remote controlling also can be connected to the operating piece 124. As the release cable 126, the inner cable of the pull control cable composed of the inner cable and the guide tube can be used. But the employment of the suitable guide means such as pulley and the slide guide makes the inner cable only be a release cable. Further, the guide tube of the pull control cable can be used as the release cable and the inner cable of the push-pull control cable can be used as the release cable.

The cable drive device 120 composed as described above operates similarly as the case of FIG. 1 in a condition in which the emergency release mechanism 121 is not operated. More specifically, in the screw-nut mechanism 14 and the control cable 15, when the third gear 30 rotates, the nut member 26 rotates together. And since the rod 32 screwed together with the nut member 26 is constrained its rotation by the guide member 34 and the slier 33, it rotates relatively against the nut member 26 to move in the axial direction. Thereby, the inner cable 45 connected to the rod 32 is operated in the axial direction. In such operation, since the right side movement of the bracket 51a is constrained by the engaging claw 122, the guide tube 49 can support the reactive force of the inner cable 45, and can perform the pulling operation of the operated member by the right side movement of the inner cable 45. Further, the inverse rotation of the motor M can release the pulling operation.

In the cable drive device 120, in case of such a failure as the breaking of the electric wire of the motor M in a condition of the inner cable 45 of the control cable 15 being pull-operated (in a condition the slider being moved toward the right side), the operating piece 124 is turned in the direction of anti-clockwise opposing the energized force of the spring 125 to release the engaging between the engaging claw 122 and the bracket 51a. Thereby, the bracket 51a and the end of the guide tube 49 moves right side as a reaction of the tension applied to the inner cable 45 making the tension of the inner cable 45 be lost. That is, the pulling operation of the operated member by the inner cable 45 is dissolved, because the guide tube 49 becomes not capable of supporting the reactive force of the inner cable 45. When the failure of the electric system is recovered, the nut member 26 is rotated by the motor M to move the rod 32 right side pushing the cushion rubber 51 to return the bracket 51a to its original position.

In this embodiment, the engaging member 122 extends in an oblique direction, and its inner surface acts as a cam. That is, the engaging member 122 is rotated clockwise by the energized force of the spring 125 to contact the end of the bracket 51a. And when the failure of the electric system is recovered and the bracket 51a is returned to its original position, the bracket 51a pushes the inside surface of the engaging member 122 pushing aside the operating piece 124 for returning to its original position. And when the bracket 51a returns to the original position, the engaging claw automatically engages with the bracket 51a again by the energized force of the spring 125.

The cable drive device described above is, same as the case of FIG. 1, as a electric cable drive device 60 of FIG. 5, used for the operation of parking brakes. The above described manually operable emergency release mechanism 121 is employed in the case that failures in the electrical system are annoyance such as the case in the electrically driven brake device 60. That is, in case of the electrical system failure in the condition the brake being applied, the brake cannot be released and the automobile cannot be moved. In this case, when the release cable 126 of the emergency release mechanism 121 is pulled, as described above, the engaging claw 122 departs from the bracket 51a, and the bracket 51a and the guide tube 49 moves forward (the right side of FIG. 1). Thereby, the tension of the inner cable 45 dissolves releasing the brake. Therefore, the automobile can be moved.

Figure 18:
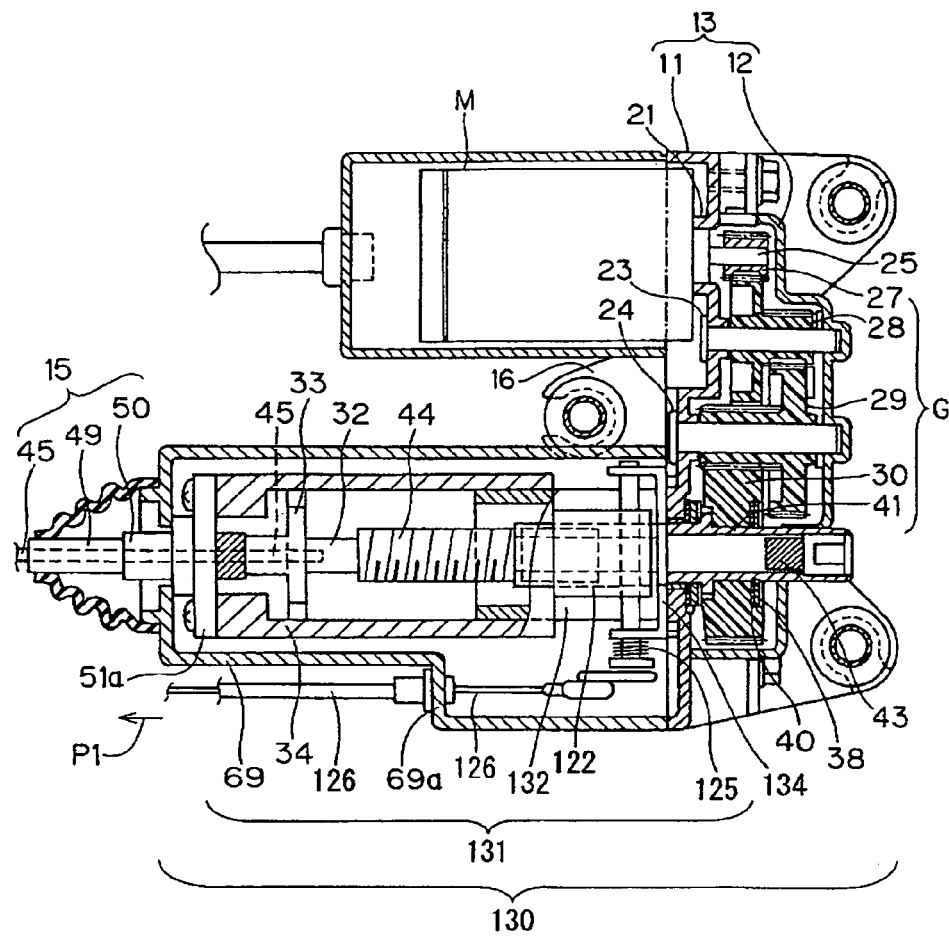
FIG. 18 is a partially notched plane view showing further the other embodiment of the cable drive device of this invention.

Referencing FIG. 18-FIG. 21, the other embodiments of the cable drive device of this invention are described. The cable drive device 130 shown in FIG. 18 is substantially same as the cable drive device 120 of FIG. 16 except for the emergency release mechanism 131. And regarding the emergency release mechanism 131, although partially it is different in the point such that the guide member 34 is movable in the axial direction and the engaging claws 122 are provided above and below, but it has fundamentally the same composition as the emergency release mechanism 121 of FIG. 16. Therefore, the description is omitted giving the same reference numerals to the same parts.

In the emergency release mechanism 131 of FIG. 18, the guide member 34 is separated from the housing 13 and integrated with the bracket 51a, and further, the second guide 132 fitted with the guide member 34 slidably is protruded from the housing 13. Furthermore, the guide member 34 and the second guide 132 are formed like rough square tube respectively, and the guide member 34 is fitted to the outside of the second guide 132 like telescopic tube. In other words, it has a configuration of the original guide tube being separated and fitted slidably. Additionally, the guide member 34 can be fitted to the inside surface of the second guide 132. And further, the guide member 34 and the second guide 132 can be composed of the upper and the lower plate only.

Figure 19:
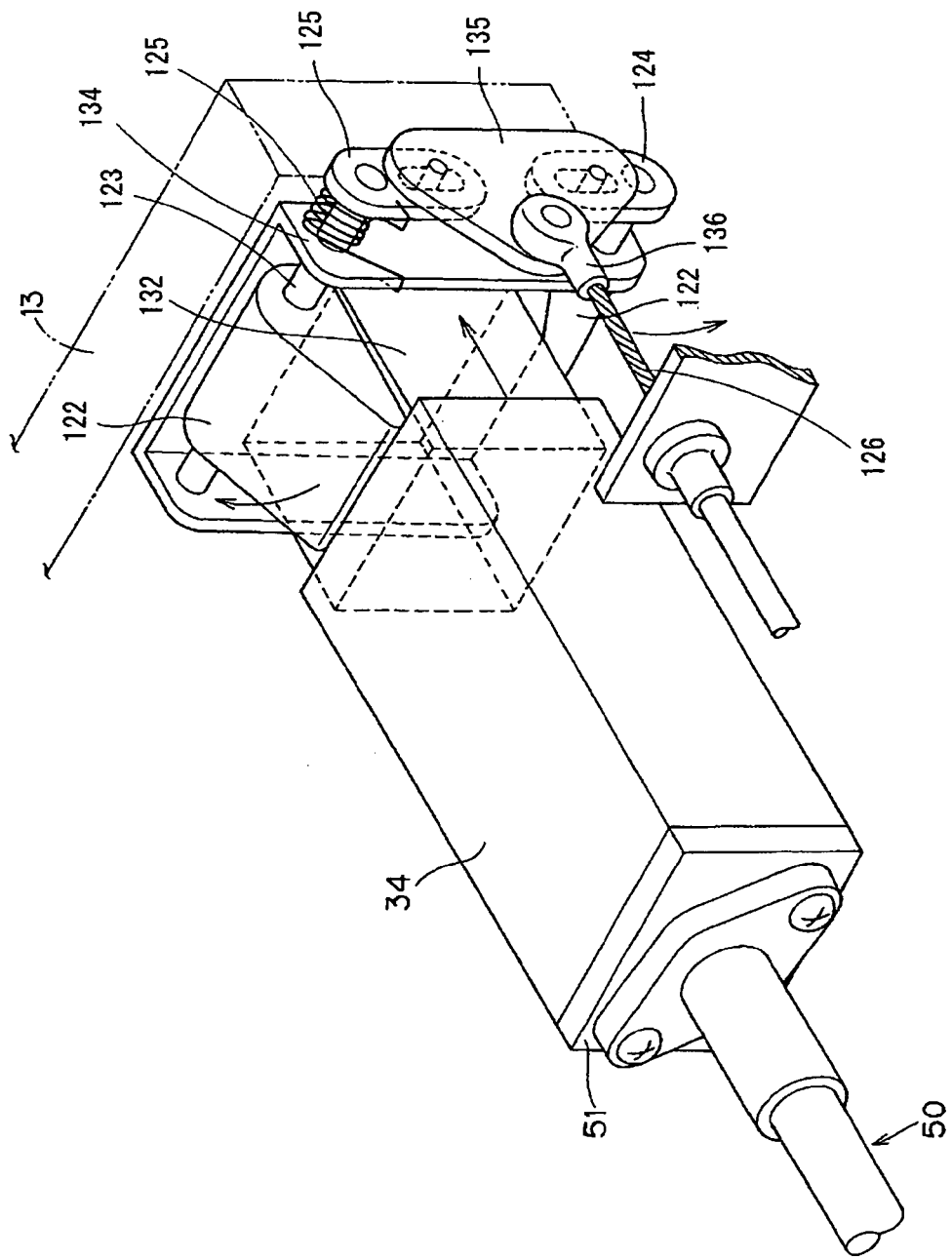
FIG. 19 is a perspective view of the emergency release mechanism in the cable drive device.

Further in this embodiment, as shown in FIG. 19, one pair of the upper and lower engaging claw 122, 122 is provided turnably on the upper end the lower end of the supporting bracket 134 mounted on the housing 13. More specifically, the bracket 134 is made to be a horseshoe like folded plate in plane view. And the supporting shaft 123 protruded right and left from the engaging claw 122 is made to be supported by the folded piece of the supporting bracket 134 turnably. The supporting bracket 134 and the second guide 132 can be integrated.

Figure 20:
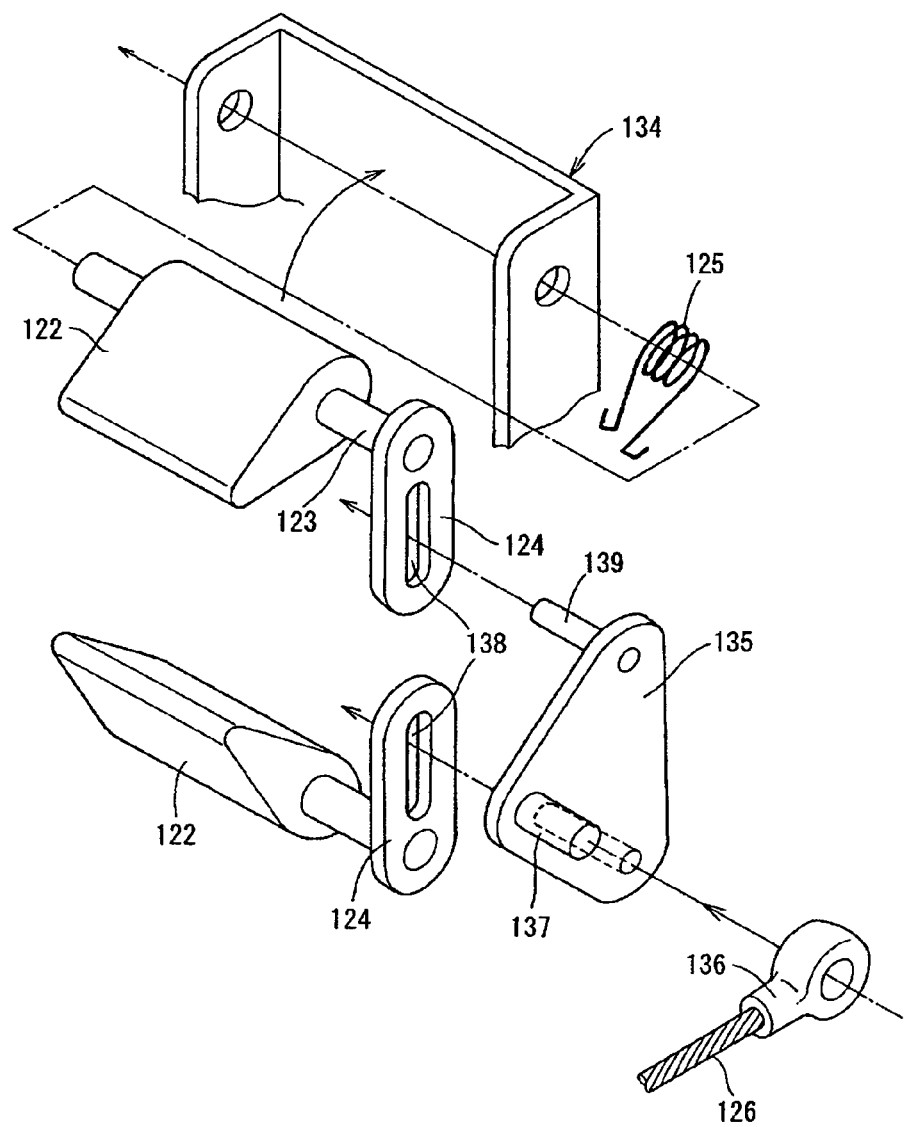
FIG. 20 is a breakdown perspective view showing the constraining mechanism of the emergency release mechanism.

Further, as shown in FIG. 20, the operating piece 124 is fixed to the end of the supporting shaft 123, a space is provided between the operating piece 124 and the bracket 134 therewith, and in the space the spring 125 to energize the engaging claw 122 is intervened. The spring 125 can be made to be a helical coil spring, and both ends of the helical coil spring is engaged with the operating piece 122 and the supporting bracket 134 (see FIG. 19).

Coming along with the provision of the one pair of engaging claw 122, a common plate 135 is connected to the end of the release cable 126, and the common plate 135 is connected to the operating piece 124 of one pair of the upper and lower engaging claws 122. In this embodiment, as shown in FIG. 19 and FIG. 20, the common plate 135 is made to be rough triangular, and the front edge of the release cable 126 is connected to the cable end 136 turnably by a pin 137. Further, a long hole 138 is formed in the operating piece 124 and by engaging it with the pin 139 protrudingly provided on the common plate 135, the linear motion of the common plate 135 and the rotative movement of the operating piece are allowed. But the other connecting means can be employed such as a long hole being provided on the common plate 135 and a pin is provided on the operating piece 124.

Further, coming along with the integration of the guide member 34 and the bracket 51a, whole of them are accommodated in a case 69 which can enclose them in airtight and water tight conditions. The case 69 can also be integrated with the housing 13. And the release cable 126 is made to be the inner cable of the pull control cable and the end of the guide tube 126a which guides the inner cable slidably is connected to the shoulder part 69a provided on the case 69.

Figure 21:
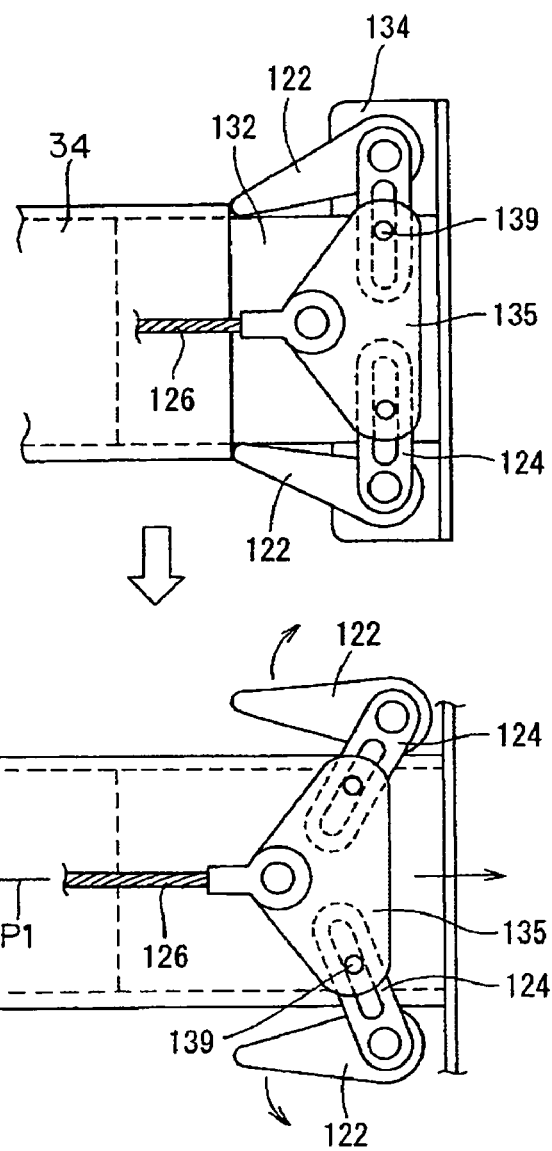
FIG. 21 is a process drawing showing the action of the emergency release mechanism of FIG. 20.

In the emergency release mechanism 130 composed as above, in a normal condition, as shown in the upper side of FIG. 21, the front edge of the engaging claw 122 is engaged with the front edge of the guide member 34. Therefore, as shown in FIG. 18, the bracket 51a and the end of the guide tube 49 cannot move toward the right side, enabling to maintain the tension of the inner cable 45 connected to the slider 33. Accordingly, the rod 32 provided with a male screw 44 moves toward the right side by the rotation of the motor M, and the slider 33 moves toward the right side under the guide of the guide member 34. Thereby, the operated members such as parking brakes can be pull-operated via the inner cable 45 connected to the slider 33 or the rod 32. In addition, in the upper condition of FIG. 9, the front edge of the engaging claw 122 is contacted to the surface of the second guide 132 by the energized force of the spring 125. In this condition, it is engaged with the front edge of the guide member 34 providing secure engaging.

In such an emergency of the electric system failure, the release cable 126 is pulled in the direction of arrow head P1. Thereby, as shown in the lower side of FIG. 21, the common plate 135 moves toward the left side making the upper operating piece 124 turn clockwise and the lower operating piece 124 turn anti-clockwise respectively, and also making one pair of the upper, lower engaging claws 122, 122 turn similarly. Thereby, the engaging of the engaging claws 122,122 with the front edge of the guide member 34 is released, and the guide member 34 moves toward the right side by being pushed by the reactive force of the inner cable 45 for the braking operation. Thereby, the tension of the inner cable 45 is released to dissolve the pulling force of the operated member such as parking brakes. In this condition, when the pulling force of the release cable 126 is weakened, the front edge of the engaging claw 122 contacts the surface of the guide member 34 by the energized force of the spring 125. Accordingly, without pulling of the release cable 126, the released condition can be maintained.

When the electric system failure is recovered, the motor M is rotated in the direction to pay out the inner cable 45. Thereby, the rod 32 of FIG. 18 moves toward the left side and the slider 33 continues to push the cushion rubber 51 of the bracket 51a left side. Therefore, the guide member 34 moves toward the left side together, and when the front edge of the guide member 34 moves further left side than the front edge of the engaging claw 122, the engaging claw 122 turns to the position where it engages with the guide member 34 by the energized force of the spring 125. Thereby, it returns to the upper condition of FIG. 21 enabling the normal pulling operation of the inner cable 45 by the motor M.

Figure 22:
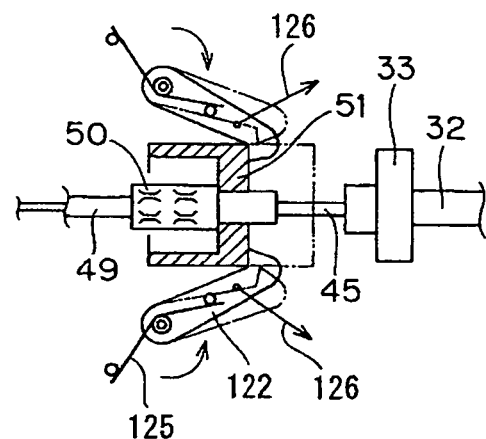
FIG. 22a-c is an outline plane view showing further the other embodiment of the release mechanism related to this invention.
Figure 22:
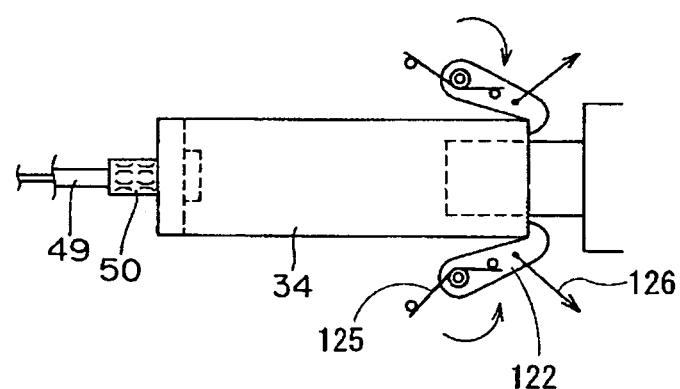
Figure 22:
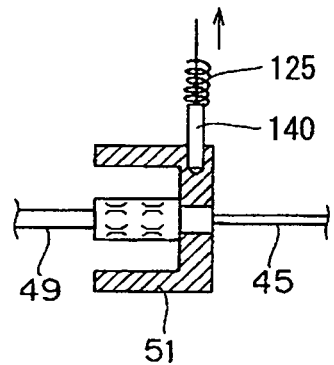

In the cable drive device 120, 130 of FIG. 16 and FIG. 18, the engaging claw 122 stretches the bracket 51a and the front edge of the guide member 34 so as to oppose the pushing force by the guide tube 49. But, as shown in FIG. 22a, FIG. 22b, the engaging claw 122 which hooks the bracket 51a and the front edge of the guide member 34 from the backside of the front edge can be employed. In this case also, it is preferable that the spring 125 for returning the engaging claw 122 is provided in the direction of engaging, and that the engaging claw 122 is contacted to the outside of the bracket 51a so as to make the engaging claw 122 not to return to the original position when the bracket 51a is advancing. Thereby, after the compression of the guide tube 49 is released by departing the engaging of the engaging claw 122 once, it can be recovered automatically to the engaged condition when the bracket 51a is returned to the original position.

Further, as shown in FIG. 22c, an engaging pin 140 which engages from the right angle against the moving direction of the bracket 51a and the guide member 34 can be employed. In this case also, the spring 125 to energize the engaging pin 140 in the direction of engaging is provided.

Figure 23:
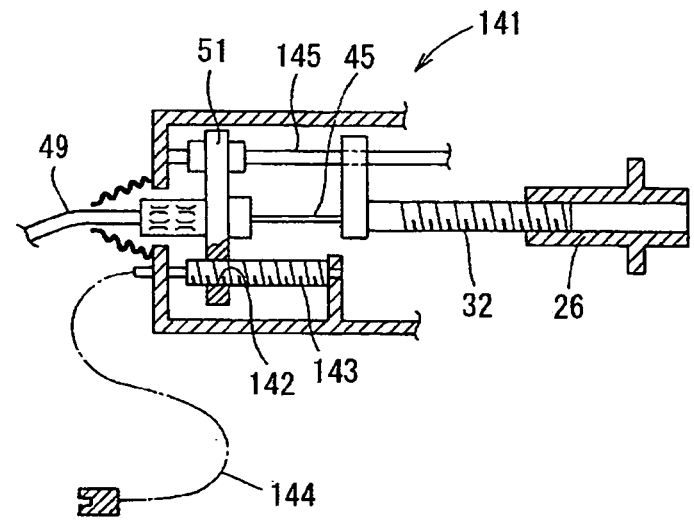
FIG. 23 is an outline plane view showing further the other embodiment of the release mechanism related to this invention.

In the emergency release mechanism 141 shown in FIG. 23, a female screw 142 is formed on the bracket 51a holding the guide tube 49, and a screw shaft 143 screwing together with the female screw is rotatably provided. And to the screw 143, a rotating cable 144 is connected. But the other rotating means such as handles can be connected. Additionally, the reference numeral 145 is a guide shaft which guides the bracket 51a axially so as not to rotate.

In the cable drive device provided with the release mechanism 141, in case of the electric system failure in the condition of the tension being applied to the inner cable 45, by rotating the other end of the rotating cable 144, the bracket 51a can be moved. Thereby the compressing force of the guide tube 49 is dissolved. And when the electric system is recovered, by rotating the rotating cable 144 inversely, the bracket 51a can be returned to the original position. In addition, the screw shaft 143 is fixed to the bracket 51a and the female screw 142 screwing together with the screw shaft can be provided rotatably.

In the above embodiment, the engaging claw 122 and the engaging pin 140 is energized by the spring 125 toward the engaging position side, but it can be so composed as follows using a so-called center-over screw; when the engaging claw 122 and the engaging pin approach the engaging position, it is energized in the engaging direction; and when they approach the departing side, it is energized in the departing direction. In this case, because it does not recover automatically, the drivers etc. have to operate it from the outside in the each case.

In the cable drive device 10 of FIG. 1 etc. the rotation of the motor M is reduced by a parallel gear type speed reducer and transmitted to the rotating member. However, in this cable drive device of this invention, the speed reducer is not limited to those speed reducers, and planet gear speed reducers can be used. Further, a speed reducer using pulleys and belts or that using chains and sprockets; so-called wrapping connector drive mechanism, can also be used. Further, a speed reducer using a conventional gear reducer and a wrapping connector drive being connected in series can be used.

Figure 24:
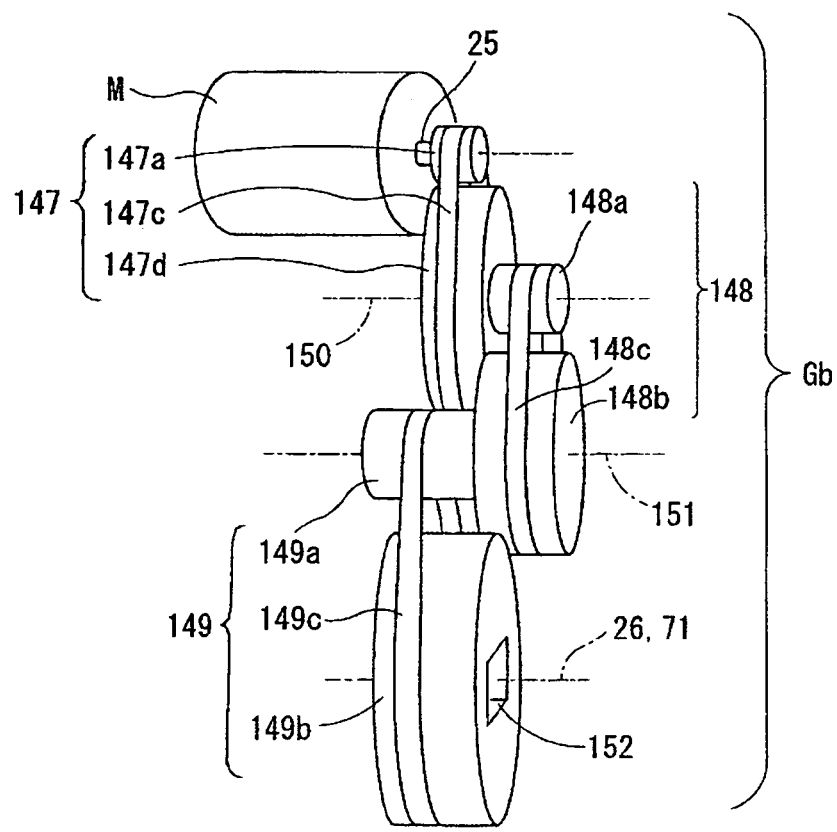
FIG. 24 is a perspective view showing an embodiment of the speed reducer related to this invention.
Figure 25:
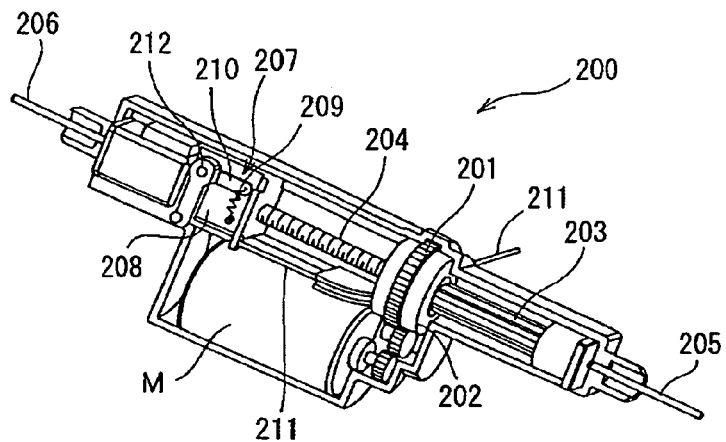
FIG. 25 is a perspective view showing an example of conventional parking brake devices.
Figure 26:
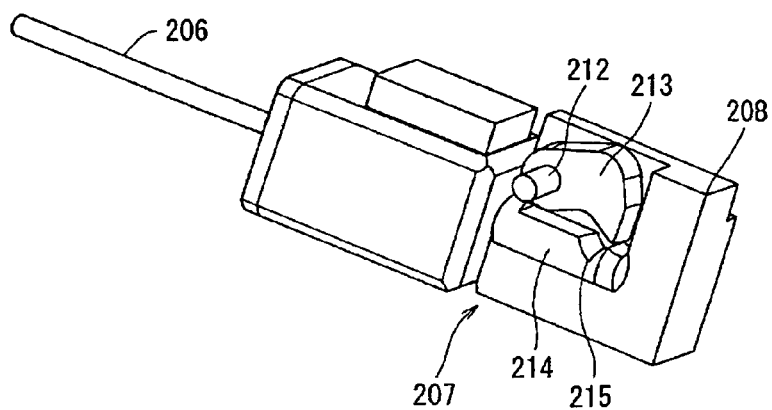
FIG. 26 is a substantial expanded view of the parking brake device.
Figure 27:
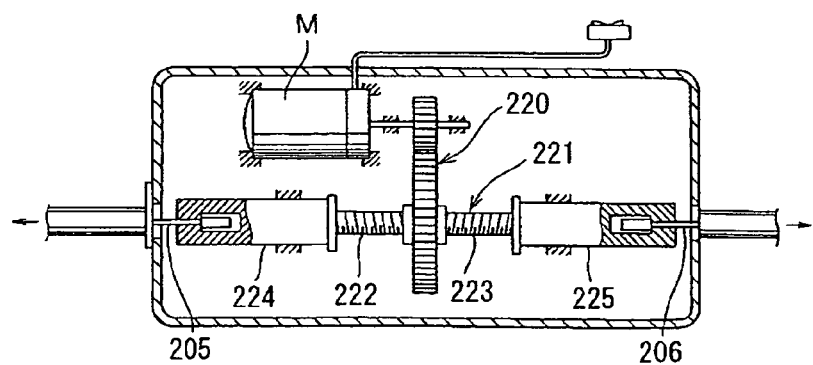
FIG. 27 is a plane view showing the other example of conventional parking brake devices.
Figure 28:
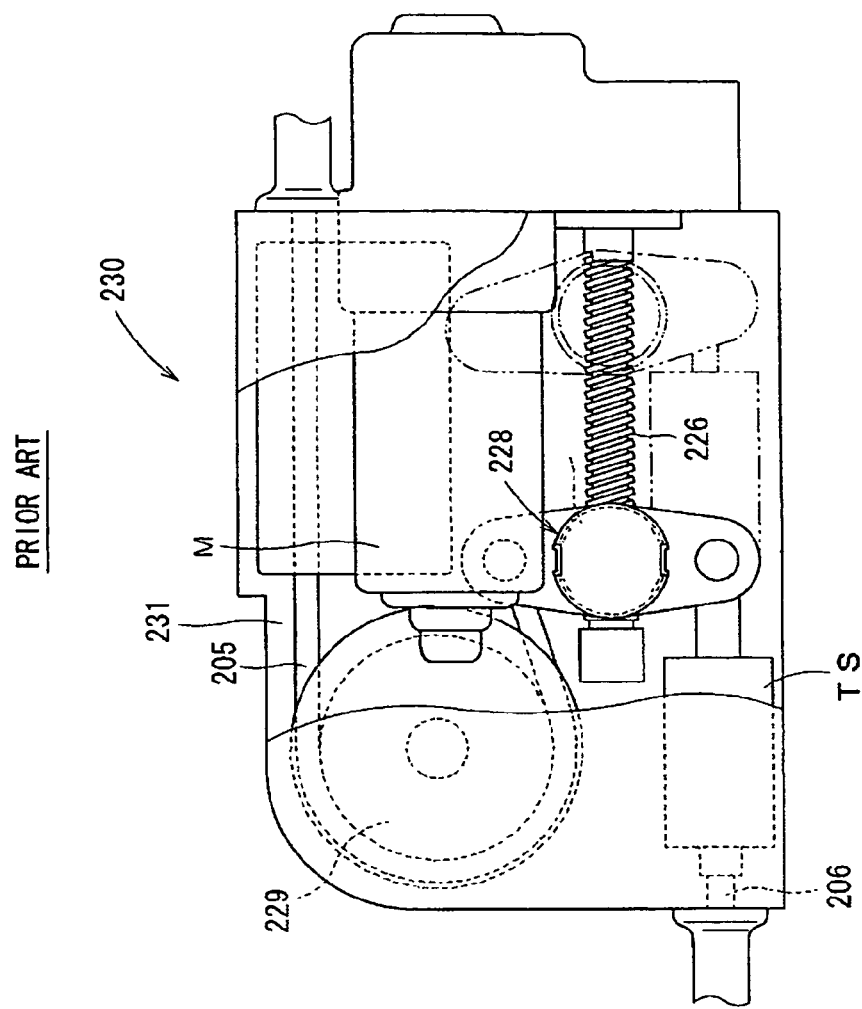
FIG. 28 is a partially notched plane view showing further the other example of conventional parking brake.
Figure 29:
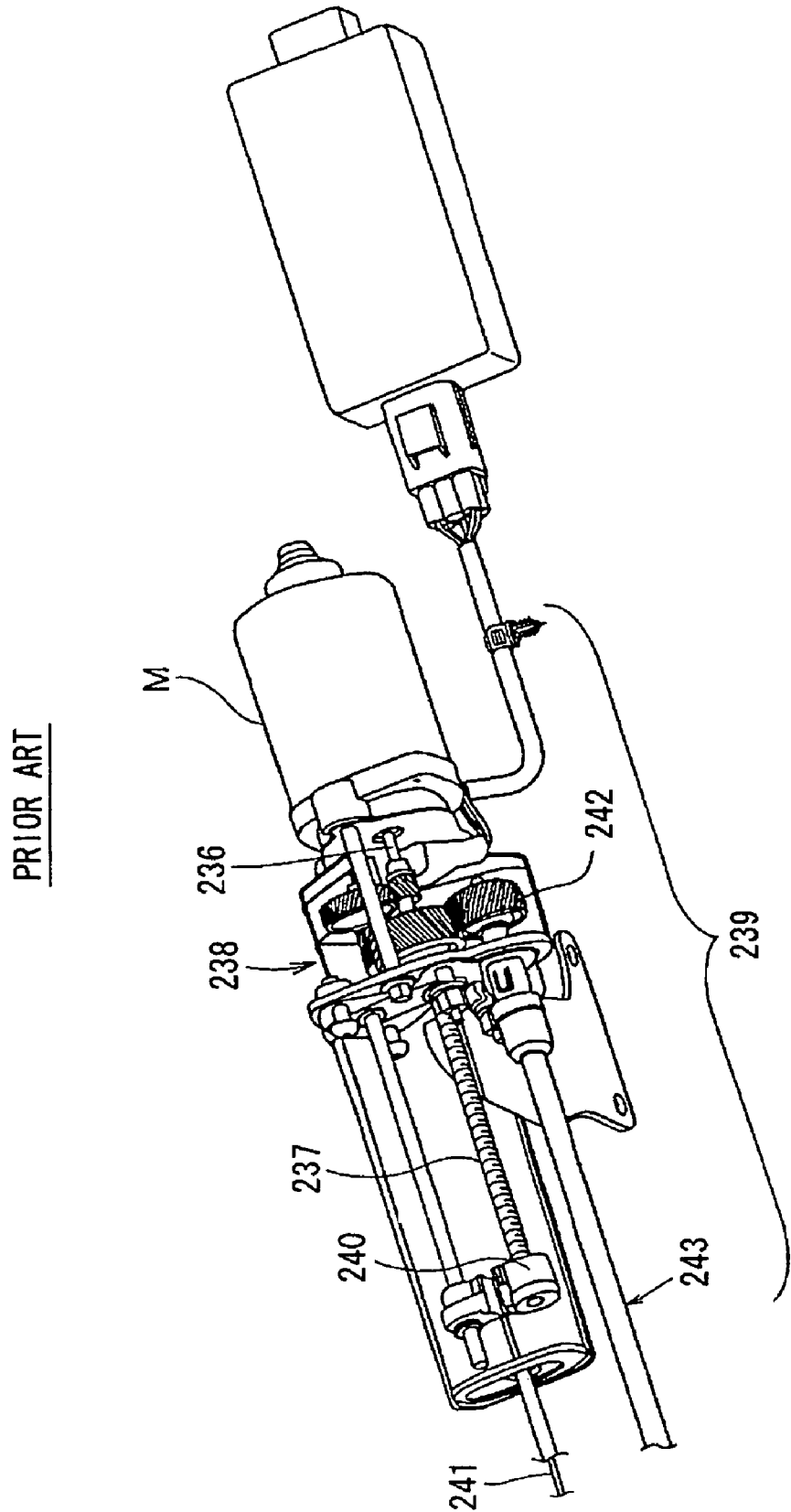
FIG. 29 is a perspective view showing further the other example of conventional parking brake devices.

FIG. 24 shows an embodiment of the pulley type speed reducer used in the cable drive device 10 of FIG. 1 etc. This speed reducer Gb is provided with three groups speed reducing parts; small diameter geared pulleys 147a, 148a, 149a; large diameter geared pulleys 147b, 148b, 149b; and geared belts (timing belts) 147c, 148c, 149c connected by being wrapped around the small diameter pulleys and the large diameter pulleys. More specifically, the first speed reducing part 147 comprises; the first small diameter geared pulley 147a fixed to the output shaft 25 of the motor M; and the first large diameter geared pulley 147b rotatably supported by the first shaft 150 and connected by the first small diameter pulley 147a and the first geared belt 147c.

The second speed reducing part 148 comprises; the second small diameter geared pulley 148a rotatably supported by the first shaft 150 so as to rotate together with the first large diameter geared pulley 147b; and the second large diameter geared pulley 148b connected by the second small diameter geared pulley 148a and the second geared belt 148c.

The third speed reducer part 149 comprises; the third small diameter geared pulley 149a rotating together with the second large diameter geared pulley 148c; and the third large diameter geared pulley (output pulley) 149b connected to the third small diameter pulley 149a via the third geared belt 149c.

In the inner perimeter of the third large diameter pulley 149b, a square through hole 152 for whirl-stop is formed and fitted to for, example, the nut member 26 of FIG. 1. In this case, on the surface of the nut member 26, four flat planes fitted to the through hole are formed. The third large diameter 149b can be fitted to the screw shaft 71 of FIG. 6, and in this case also, on the surface of the screw shaft a flat plane having square cross section is formed.

In the case that the pulley type speed reducer 146 shown in FIG. 24 is used, the same cable driving action as that using the gear type speed reducer is achieved with subdued sound. In addition, in the case that slipping is allowed between the belt and pulley, a combination of a V belt and V groove pulley can be used in place of the combination of a geared belt and geared pulley. Further, a combination of a chain and sprocket can be used. As the chain, a silent chain is preferable.

What is claimed is:
1. An electric cable drive device, comprising:
a motor;

a speed reducer connected to an output shaft of the motor;
a rotating member connected to an output shaft of the speed reducer;
a transducer converting a rotation of the rotating member into a linear motion of a linear motion member;
a cable connected to the linear motion member;
a load detecting means detecting a tension of the cable; and
a control means transmitting a warning signal when an output of the load detecting means exceeds a given tolerable range, and
wherein the rotating member of the transducer is a male screw, and the linear motion member is a nut member which screws together with the male screw, and
wherein the nut member comprises an equalizer in a condition capable of swinging.

2. A cable drive device according to claim 1, wherein the control means halts the motor when the cable becomes unloaded in a paying out operation of the cable.

3. An electric cable drive device, comprising:
a motor;
a speed reducer connected to an output shaft of the motor;
a rotating member connected to an output shaft of the speed reducer;
a transducer converting a rotation of the rotating member into a linear motion of a linear motion member;
a cable connected to the linear motion member; and
a detecting means detecting an amount of operation of the cable;
wherein, the detecting means comprises a conversion means which counts pulses from an output of a pulse generating means generating pulses in proportion to a rotation of the motor, and converts into an amount of operation of the cable,
wherein the rotating member of the transducer is a male screw, and the linear motion member is a nut member which screws together with the male screw, and
wherein the nut member comprises an equalizer in a condition capable of swinging.

4. A cable drive device according to claim 3, 1, or 2, wherein the rotating member of the transducer comprises a female screw, and the linear motion member is a male screw which screws together with the female screw of the rotating member.

5. A cable drive device according to claim 1 or 2, wherein the load detecting means comprises a strain gage.

6. A cable drive device according to claim 3 or 1, wherein the nut member comprises a grease chamber.

7. A cable drive device according to claim 3, 1, or 2, wherein the cable operates a parking brake of an automobiles.

8. A cable drive device according to claim 7, wherein the motor is a brushless motor, and the pulse generating means determining the excitation timing of the coil phase of the drive mechanism is provided in a brushless motor.

9. An electric cable drive device, comprising:
a motor;
a speed reducer connected to an output shaft of the motor;
a rotating member connected to an output shaft of the speed reducer;
a transducer converting a rotation of the rotating member into a linear motion of a linear motion member;
a cable connected to the linear motion member;
a load detecting means detecting a tension of the cable; and
a control means transmitting a warning signal when an output of the load detecting means exceeds a given tolerable range, and
wherein the load detecting means comprises a spring which elastically deforms against the tensile force of the cable, and a detecting means detecting a deformation of the spring.

10. An electric cable drive device, comprising:
a motor;
a speed reducer connected to an output shaft of the motor;
a rotating member connected to an output shaft of the speed reducer;
a linear motion member converting a rotation of the rotating member into a linear motion of a linear motion member, screwing together with the rotating member;
a cable connected to the linear motion member;
an emergency release mechanism releasing an operating physical force of the cable by an external operation,
wherein the emergency release mechanism comprises a rotating means rotating the rotating member from outside, and
wherein an end of the rotating means is protruding from a housing of the speed reducer, and the rotating means rotating the rotating member is an engaging part having a square cross section provided on the protruding end of the rotating member.

11. An electrical parking brake device for automobiles comprising:
the cable drive device comprising:
a motor;
a speed reducer connected to an output shaft of the motor;
a rotating member connected to an output shaft of the speed reducer;
a transducer converting a rotation of the rotating member into a linear motion of a linear motion member;
a cable connected to the linear motion member; and
a detecting means detecting an amount of operation of the cable;
wherein, the detecting means comprises a conversion means which counts pulses from an output of a pulse generating means generating pulses in proportion to a rotation of the motor, and converts into an amount of operation of the cable,
a brake lever to which the cable of the brake device or the inner cable is connected; and
the spring energizing the brake lever to the release side of the brake; and
a friction member for the brake connected to the brake lever.

12. An electric cable drive device, comprising:
a motor;
a speed reducer connected to an output shaft of the motor;
a rotating member connected to an output shaft of the speed reducer;
a linear motion member converting a rotation of the rotating member into a linear motion of a linear motion member, screwing together with the rotating member;
a cable connected to the linear motion member;
an emergency release mechanism releasing an operating physical force of the cable by an external operation,
wherein the emergency release mechanism comprises a rotating means rotating the rotating member from outside, and
wherein the control cable is a pull control cable operating a brake, and wherein a tension by a return spring of the brake is always applied to the inner cable of the pull control cable.

13. An electric cable drive device, comprising:
a motor;
a speed reducer connected to an output shaft of the motor;

a rotating member connected to an output shaft of the speed reducer;
a transducer converting a rotation of the rotating member into a linear motion of a linear motion member;
a cable connected to the linear motion member;
a load detecting means detecting a tension of the cable; and
a control means transmitting a warning signal when an output of the load detecting means exceeds a given tolerable range, and
wherein the load detecting means comprises a spring which elastically deforms against the tensile force of the cable, and a detecting means detecting a deformation of the spring,
wherein the control means halts the motor when the cable becomes unloaded in a paying out operation of the cable.

14. An electrical parking brake device for automobiles comprising:
the cable drive device comprising:
a motor;
a speed reducer connected to an output shaft of the motor;
a rotating member connected to an output shaft of the speed reducer;
a transducer converting a rotation of the rotating member into a linear motion of a linear motion member;
a cable connected to the linear motion member;
a load detecting means detecting a tension of the cable;
a control means transmitting a warning signal when an output of the load detecting means exceeds a given tolerable range;
a brake lever to which the cable of the brake device or the inner cable is connected; and
the spring energizing the brake lever to the release side of the brake; and
a friction member for the brake connected to the brake lever.

15. An electrical parking brake device for automobiles comprising:
the cable drive device comprising:
a motor;
a speed reducer connected to an output shaft of the motor;
a rotating member connected to an output shaft of the speed reducer;
a linear motion member converting a rotation of the rotating member into a linear motion of a linear motion member, screwing together with the rotating member;
a cable connected to the linear motion member;
an emergency release mechanism releasing an operating physical force of the cable by an external operation, wherein the emergency release mechanism comprises a rotating means rotating the rotating member from outside;
a brake lever to which the cable of the brake device or the inner cable is connected; and
the spring energizing the brake lever to the release side of the brake; and
a friction member for the brake connected to the brake lever.

* * * * *